(12) United States Patent
Nishioka

(10) Patent No.: US 9,858,609 B2
(45) Date of Patent: Jan. 2, 2018

(54) INFORMATION PROCESSING APPARATUS, INFORMATION PROCESSING METHOD, AND INFORMATION PROCESSING PROGRAM

(71) Applicant: Rakuten, Inc., Shinagawa-ku, Tokyo (JP)

(72) Inventor: Yuhei Nishioka, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 172 days.

(21) Appl. No.: 14/368,072

(22) PCT Filed: Mar. 22, 2013

(86) PCT No.: PCT/JP2013/058233
§ 371 (c)(1),
(2) Date: Jun. 23, 2014

(87) PCT Pub. No.: WO2014/002549
PCT Pub. Date: Jan. 3, 2014

(65) Prior Publication Data
US 2014/0372257 A1    Dec. 18, 2014

(30) Foreign Application Priority Data
Jun. 27, 2012    (JP) .................... 2012-144799

(51) Int. Cl.
*G06Q 30/06*    (2012.01)
*G06F 17/30*    (2006.01)

(52) U.S. Cl.
CPC ..... *G06Q 30/0627* (2013.01); *G06F 17/3064* (2013.01); *G06F 17/30112* (2013.01); *G06F 17/30286* (2013.01); *G06F 17/30864* (2013.01)

(58) Field of Classification Search
CPC .......... G06Q 30/0627; G06F 17/30112; G06F 17/3064; G06F 17/30864; G06F 17/30286
(Continued)

(56) References Cited

U.S. PATENT DOCUMENTS 9,275,147 B2* 3/2016 Meschkat ........... G06F 17/3064
2007/0156669 A1* 7/2007 Marchisio ......... G06F 17/30731
(Continued)

FOREIGN PATENT DOCUMENTS

JP    2012-501499 A    1/2012

OTHER PUBLICATIONS

C. Ochs, T. Tian, J. Geller and S. A. Chun, "Google Knows Who is Famous Today—Building an Ontology from Search Engine Knowledge and DBpedia," 2011 IEEE Fifth International Conference on Semantic Computing, Palo Alto, CA, 2011, pp. 320-327. doi: 10.1109/ICSC.2011.50.*
(Continued)

*Primary Examiner* — Maria Teresa O Thein
*Assistant Examiner* — Michelle T Kringen
(74) *Attorney, Agent, or Firm* — Sughrue Mion, PLLC

(57) ABSTRACT

When a word suitable for an attribute value of a search object is included in search words that are being inputted, the attribute value can be presented as a candidate for a search condition. When there are two or more search words that are being inputted, an information processing apparatus identifies a search object division suitable for a first search word among the search words from a plurality of search object divisions. From a storage unit that stores an attribute name and an attribute value of an attribute corresponding to the search object division in association with each other, the information processing apparatus acquires an attribute value suitable for a second search word different from the first search word among the search words from among attribute
(Continued)

values associated with the identified search object division. The information processing apparatus causes the acquired attribute value to be presented as a candidate for a search condition.

7 Claims, 22 Drawing Sheets

(58) Field of Classification Search
USPC .......................... 705/27.1, 26.1, 26.7, 26.63
See application file for complete search history.

(56) References Cited

U.S. PATENT DOCUMENTS

| | | | |
|---|---|---|---|
| 2008/0140637 A1* | 6/2008 | Kumar | G06F 17/30873 |
| 2009/0240672 A1* | 9/2009 | Costello | 707/4 |
| 2010/0057698 A1 | 3/2010 | Prasad Kantamneni et al. | |
| 2011/0072000 A1 | 3/2011 | Haas et al. | |
| 2011/0184942 A1* | 7/2011 | Jain | G06F 17/30663 |
| | | | 707/723 |
| 2011/0314005 A1* | 12/2011 | Guo | 707/723 |
| 2012/0265779 A1* | 10/2012 | Hsu | G06F 17/3064 |
| | | | 707/767 |
| 2014/0136468 A1* | 5/2014 | Faratin | G06F 17/30625 |
| | | | 706/55 |

OTHER PUBLICATIONS

International Search Report of PCT/JP2013/058233 dated Apr. 16, 2013.

* cited by examiner

FIG.2

| CATEGORY NAME | ATTRIBUTE NAME | ATTRIBUTE VALUE |
|---|---|---|
| SAKE | PRODUCTION AREA | CHUGOKU |
| | | CHUBU |
| | | KANTO |
| | INNER CAPACITY | 500 |
| | | 750 |
| | | 1000 |
| MINERAL WATER | PRODUCTION AREA | CHUGOKU |
| | | CHUBU |
| | | KANTO |
| | INNER CAPACITY | 350 |
| | | 500 |
| | | 1000 |
| HANDBAG | BRAND | ABC |
| | | DEF |
| | | REDGGGG |
| | COLOR | RED |
| | | WHITE |
| | | BLUE |
| | | BLACK |
| ROUTER (ELECTRIC DRILL) | NUMBER OF REVOLUTIONS (REVOLUTIONS/MINUTE) | 400 |
| | | 500 |
| | | 600 |
| ROUTER (PC / PERIPHERAL DEVICE) | TRANSFER SPEED (Mbps) | 100 |
| | | 500 |
| | | 1000 |

FIG.8A
MEMBER INFORMATION DB  12a

| USER ID |
| --- |
| PASSWORD |
| NICKNAME |
| NAME |
| DATE OF BIRTH |
| GENDER |
| POSTAL CODE |
| ADDRESS |
| PHONE NUMBER |
| EMAIL ADDRESS |
| . . . |

FIG.8B
CATEGORY INFORMATION DB  12b

| CATEGORY ID |
| --- |
| CATEGORY NAME |
| LEVEL |
| PARENT CATEGORY ID |
| CHILD CATEGORY ID LIST |
| ATTRIBUTE INFORMATION 1 |
| ATTRIBUTE INFORMATION 2 |
| . . . |

FIG.8C
ATTRIBUTE INFORMATION

| ATTRIBUTE ID |
| --- |
| ATTRIBUTE NAME |
| ATTRIBUTE VALUE 1 |
| ATTRIBUTE VALUE 2 |
| . . . |

FIG.8D
TOPIC INFORMATION DB  12c

| TOPIC ID |
| --- |
| TOPIC NAME |
| . . . |

FIG.8E
SALE ITEM INFORMATION DB  12d

| SHOP ID |
| --- |
| SALE ITEM ID |
| PRODUCT CODE |
| CATEGORY ID |
| SALE ITEM NAME |
| SALE ITEM IMAGE URL |
| SALE ITEM DESCRIPTION |
| SALE ITEM PRICE |
| ATTRIBUTE VALUE 1 |
| ATTRIBUTE VALUE 2 |
| . . . |

FIG.12A

CATEGORY INFORMATION DB  12b

| CATEGORY ID |
| --- |
| CATEGORY NAME |
| RELATED TERM |
| LEVEL |
| PARENT CATEGORY ID |
| CHILD CATEGORY ID LIST |
| ATTRIBUTE INFORMATION 1 |
| ATTRIBUTE INFORMATION 2 |
| . . . |

FIG.12B

| CATEGORY NAME | RELATED TERM | ATTRIBUTE NAME | ATTRIBUTE VALUE |
| --- | --- | --- | --- |
| ROUTER (ELECTRIC DRILL) | REVOLUTIONS/MINUTE | NUMBER OF REVOLUTIONS (REVOLUTIONS/MINUTE) | 400 |
| | | | 500 |
| | | | 600 |
| ROUTER (PC / PERIPHERAL DEVICE) | Mbps | TRANSFER SPEED (Mbps) | 100 |
| | | | 500 |
| | | | 1000 |

120 — NARROW DOWN BY CATEGORY ▼

110 — ROUTER  500mbps                                SEARCH — 130

200 — ROUTER (CATEGORY)
DIY > ELECTRIC DRIVER

ROUTER (CATEGORY)
PC / PERIPHERAL DEVICE

ROUTER (CATEGORY)   TRANSFER SPEED: "500"
PC / PERIPHERAL DEVICE

ROUTER (CATEGORY)   NUMBER OF REVOLUTIONS: "500"
DIY > ELECTRIC DRIVER

| CATEGORY NAME | ATTRIBUTE NAME | ATTRIBUTE VALUE | NUMBER OF ITEMS |
|---|---|---|---|
| SAKE | PRODUCTION AREA | CHUGOKU | 100 |
| | | CHUBU | 200 |
| | | KANTO | 50 |

ATTRIBUTE INFORMATION

| ATTRIBUTE ID |
|---|
| ATTRIBUTE NAME |
| RELATED TERM |
| ATTRIBUTE VALUE 1 |
| ATTRIBUTE VALUE 2 |
| . . . |

| CATEGORY NAME | ATTRIBUTE NAME | RELATED TERM | ATTRIBUTE VALUE |
|---|---|---|---|
| LIQUID CRYSTAL TV | POWER CONSUMPTION | W | 30 |
| | | | 32 |
| | | | 35 |
| | SCREEN SIZE | INCH | 26 |
| | | | 32 |
| | | | 40 |

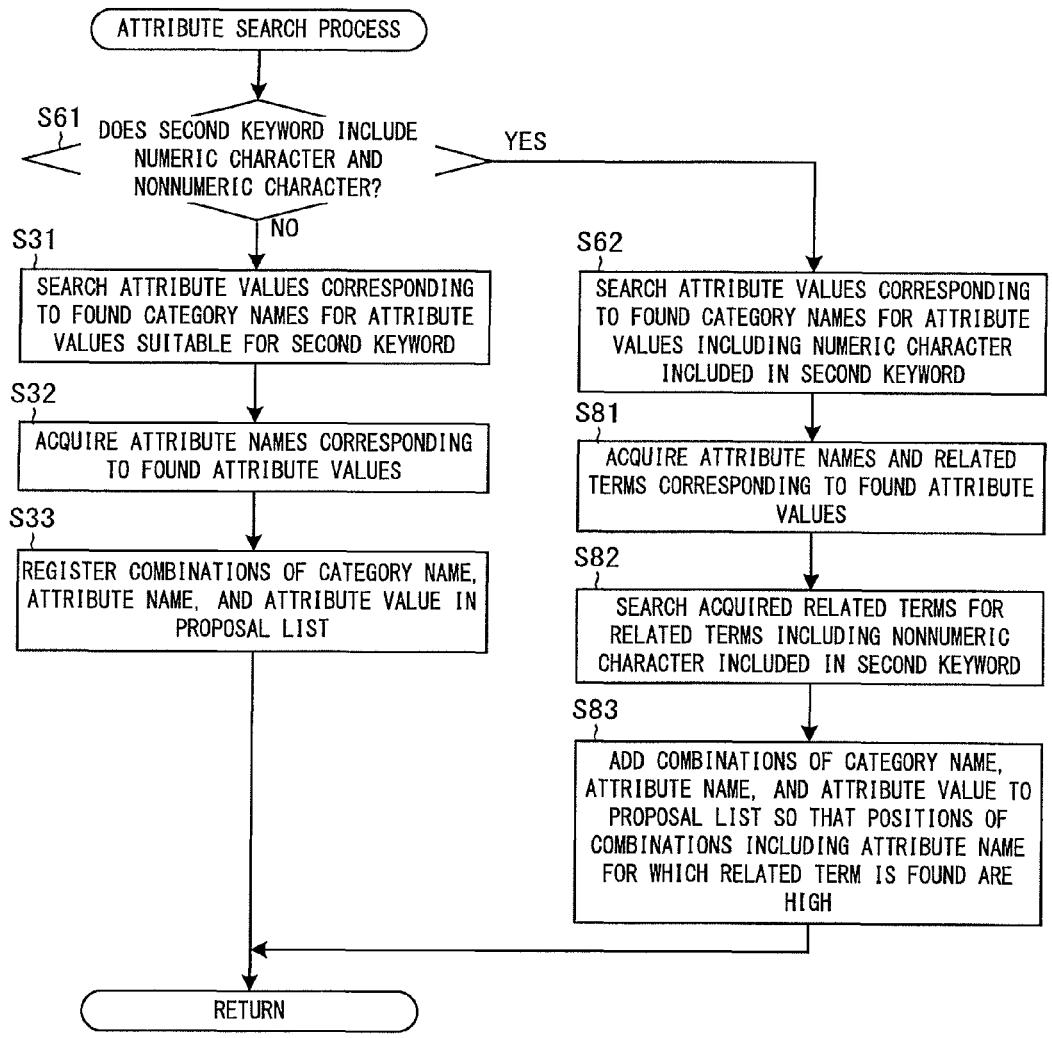

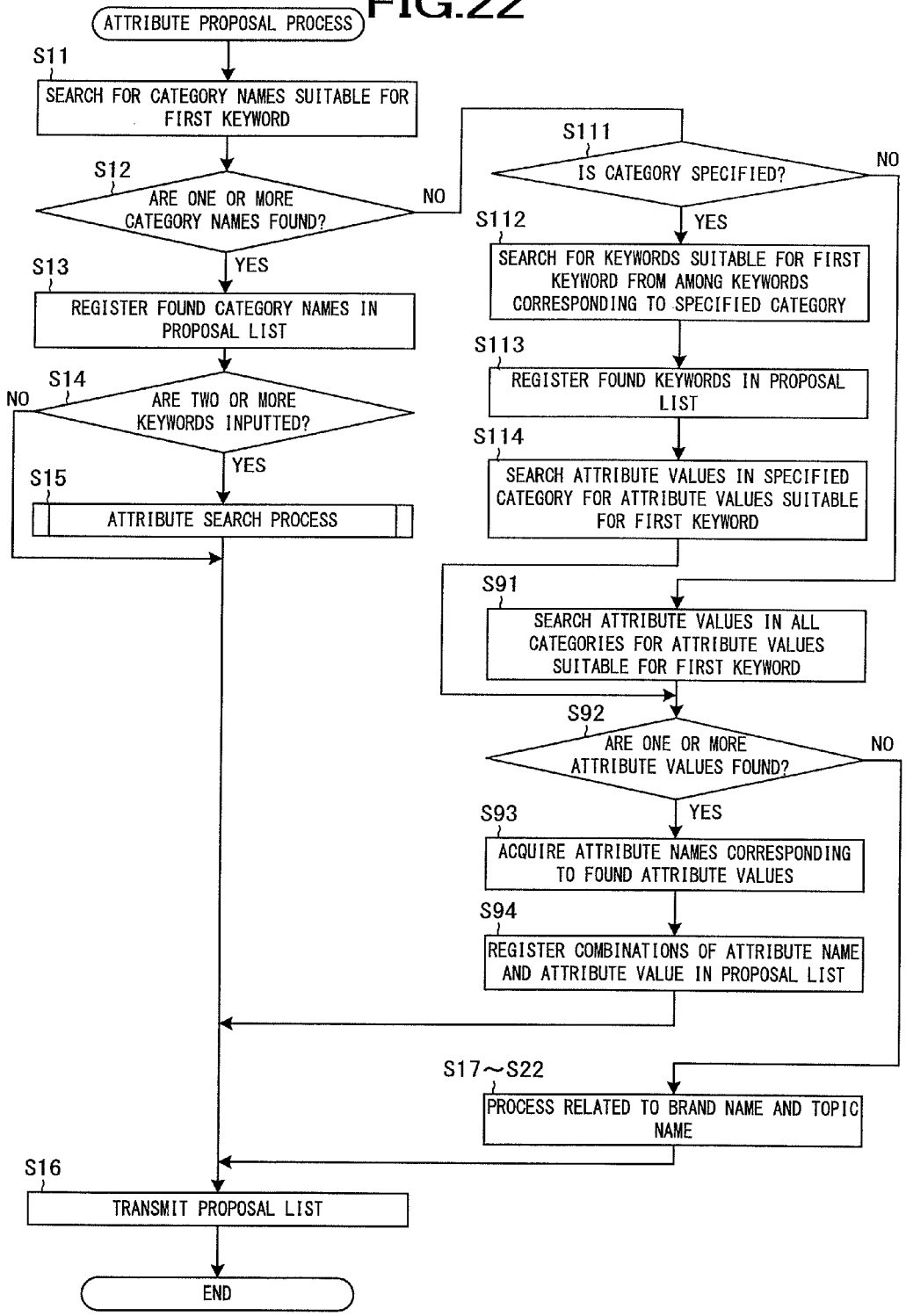

INFORMATION PROCESSING APPARATUS, INFORMATION PROCESSING METHOD, AND INFORMATION PROCESSING PROGRAM

CROSS REFERENCE TO RELATED APPLICATIONS

This is a National Stage of International Application No. PCT/JP2013/058233 filed Mar. 22, 2013, claiming priority based on Japanese Patent Application No. 2012-144799 filed Jun. 27, 2012, the contents of all of which are incorporated herein by reference in their entirety.

TECHNICAL FIELD

The present invention relates to a technical field of a system that searches for search objects on the basis of search words inputted by a user.

BACKGROUND ART

Conventionally, search systems are known which perform a search process on the basis of search words inputted by a user. Among such systems, for example, a search support system is proposed which is described in Patent Literature 1.

On the other hand, a technique is known which presents a candidate for a search word including a search word that is being inputted. For example, when "ABODE" is a brand name of an electrical product, if a user inputs "ABODE P", for example, a search word "ABODE Phone" is presented. When the user selects the "ABODE Phone", search objects are searched for by using the search words "ABODE Phone".

Further, a technique is known which presents a division related to a search word that is being inputted. For example, when a user inputs "ABODE", information "ABCDE home electric appliance" is presented. When the user selects the "ABODE home electric appliance", a search of search objects included in a category of home electric appliance by using a search word "ABODE" is performed.

CITATION LIST

Patent Literature

Patent Literature 1: JP 2012-501499 A

SUMMARY OF INVENTION

Technical Problem

By the way, when there is a plurality of search words that are being inputted, the search words may include not only a word indicating a search object itself, but also a word indicating an attribute value of the search object and/or a part of a word indicating an attribute value of the search object. Therefore, when a search word suitable for an attribute value is inputted, if the attribute value is presented as a candidate for a search condition, it is possible to reduce the burden of a user to specify a search condition.

The present invention is made in view of the above situation, and an object of the present invention is to provide an information processing apparatus, an information processing method, and an information processing program, which can cause an attribute value of a search object as a candidate for a search condition to be presented if there is a search word suitable for the attribute value among search words that are being inputted.

Solution to Problem

In order to solve the above problem, the invention according to an exemplary embodiment is an information processing apparatus comprising: a division identification means that, when there are two or more search words that are being inputted by a user, identifies, from a plurality of search object divisions, a search object division suitable for a first search word among the search words that are being inputted; an attribute value acquisition means that acquires, from a storage means that stores an attribute name and an attribute value of an attribute corresponding to the search object division in association with each other, an attribute value that is included in attribute values associated with the search object division identified by the division identification means and is suitable for a second search word different from the first search word among the search words that are being inputted; and a presentation control means that causes the attribute value acquired by the attribute value acquisition means to be presented as a candidate for a search condition.

According to this invention, from among attribute values corresponding to a search object division suitable for the first search word among the two or more search words that are being inputted by the user, an attribute value suitable for the second search word among two or more search words that are being inputted by a user is presented. Therefore, when a word suitable for an attribute value of a search object is included in search words that are being inputted, the attribute value can be presented as a candidate for a search condition.

The invention according to an exemplary embodiment is the information processing apparatus, wherein the presentation control means causes the attribute value acquired by the attribute value acquisition means and the attribute name associated with the attribute value to be presented as the candidate for the search condition.

According to this invention, a combination of an attribute name and an attribute value is presented as a candidate for a search condition. Therefore, the user can easily recognize what attribute value of an attribute is a candidate for a search condition.

The invention according to an exemplary embodiment is the information processing apparatus, wherein every time a character included in the search word is inputted by the user, the division identification means causes the attribute value acquired by the attribute value acquisition means according to the search word that is being inputted at that time to be presented.

According to this invention, it is possible to present an attribute value corresponding to input of a character from the user in real time as a candidate for a search condition.

The invention according to an exemplary embodiment is the information processing apparatus, further comprising: an object search means that, when any one of one or more presented attribute values is selected by a user, searches search objects included in the search object division identified by the division identification means for a search object whose attribute value of an attribute indicated by the attribute name associated with the selected attribute value is the same as the selected attribute value.

According to this invention, a search object which is included in a search object division suitable for the first search word and which has an attribute value suitable for the second search word is searched for. Therefore, the user can easily specify a search object division and an attribute value as search conditions. Further, it is possible to prevent search objects other than search objects having an attribute value desired by the user from being searched for.

The invention according to an exemplary embodiment is the information processing apparatus, wherein the presentation control means determines a priority of presentation of the attribute value on the basis of a relationship between the search object division identified by the division identification means and the second search word.

According to this invention, the priority of presentation of the attribute value is determined on the basis of a relationship between a search object division suitable for the first search word and the second search word. Therefore, the user can easily find an attribute value corresponding to a search object division desired by the user.

The invention according to an exemplary embodiment is the information processing apparatus, further comprising: a number acquisition means that acquires a number of search objects, among search objects included in the search object division identified by the division identification means, whose attribute value of an attribute indicated by the attribute name associated with the attribute value acquired by the attribute value acquisition means are the same as the acquired attribute value, wherein the presentation control means determines a priority of presentation of the attribute value on the basis of the number acquired by the number acquisition means.

According to this invention, the priority of presentation of the attribute value is determined on the basis of the number of search objects which are included in a division suitable for the first search word and which have an attribute value suitable for the second search word. Therefore, the user can easily find an attribute value that is probably desired by the user.

The invention according to an exemplary embodiment is the information processing apparatus, wherein the presentation control means determines a priority of presentation of the attribute value on the basis of a relationship between an attribute indicated by the attribute name associated with the attribute value acquired by the attribute value acquisition means and the second search word.

According to this invention, the priority of presentation of the attribute value is determined on the basis of a relationship between an attribute indicated by an attribute name corresponding to an attribute value suitable for the first search word and the second search word. Therefore, the user can easily find an attribute value of an attribute desired by the user.

The invention according to an exemplary embodiment is an information processing method performed by a computer, the method comprising: a division identification step of, when there are two or more search words that are being inputted by a user, identifying, from a plurality of search object divisions, a search object division suitable for a first search word among the search words that are being inputted; an attribute value acquisition step of acquiring, from a storage means that stores an attribute name and an attribute value of an attribute corresponding to the search object division in association with each other, an attribute value that is included in attribute values associated with the search object division identified in the division identification step and is suitable for a second search word different from the first search word among the search words that are being inputted; and a presentation control step of causing the attribute value acquired in the attribute value acquisition step to be presented as a candidate for a search condition.

The invention according to an exemplary embodiment is an information processing program that causes a computer to function as: a division identification means that, when there are two or more search words that are being inputted by a user, identifies, from a plurality of search object divisions, a search object division suitable for a first search word among the search words that are being inputted; an attribute value acquisition means that acquires, from a storage means that stores an attribute name and an attribute value of an attribute corresponding to the search object division in association with each other, an attribute value that is included in attribute values associated with the search object division identified by the division identification means and is suitable for a second search word different from the first search word among the search words that are being inputted; and a presentation control means that causes the attribute value acquired by the attribute value acquisition means to be presented as a candidate for a search condition.

Advantageous Effect of Invention

According to the present invention, from among attribute values corresponding to a search object division suitable for the first search word among the two or more search words that are being inputted by the user, an attribute value suitable for the second search word among two or more search words that are being inputted by a user is presented. Therefore, when a word suitable for an attribute value of a search object is included in search words that are being inputted, the attribute value can be presented as a candidate for a search condition.

BRIEF DESCRIPTION OF DRAWINGS

FIG. 2 is a diagram showing an example of category names, attribute names, and attribute values.

FIG. 8A is a diagram showing an example of content registered in a member information DB 12a. FIG. 8B is a diagram showing an example of content registered in a category information DB 12b. FIG. 8C is a diagram showing an example of content set in attribute information. FIG. 8D is a diagram showing an example of content registered in a topic information DB 12c. FIG. 8E is a diagram showing an example of content registered in a sale item information DB 12d.

FIG. 12A is a diagram showing an example of content registered in the category information DB 12b. FIG. 12B is a diagram showing a registration example of related terms. FIG. 12C is a diagram showing a presentation example of combinations of a category name, an attribute name, and attribute values.

FIG. 17 is a flowchart showing a process example of an attribute search process of the system control unit 14 of the online shopping mall server 1 according to an embodiment.

FIG. 22 is a flowchart showing a process example of an attribute proposal process of the system control unit 14 of the online shopping mall server 1 according to an embodiment.

DESCRIPTION OF EMBODIMENTS

Hereinafter, embodiments of the present invention will be described in detail with reference to the drawings. The embodiments described below are embodiments where the present invention is applied to an information processing system.

Figure 1:
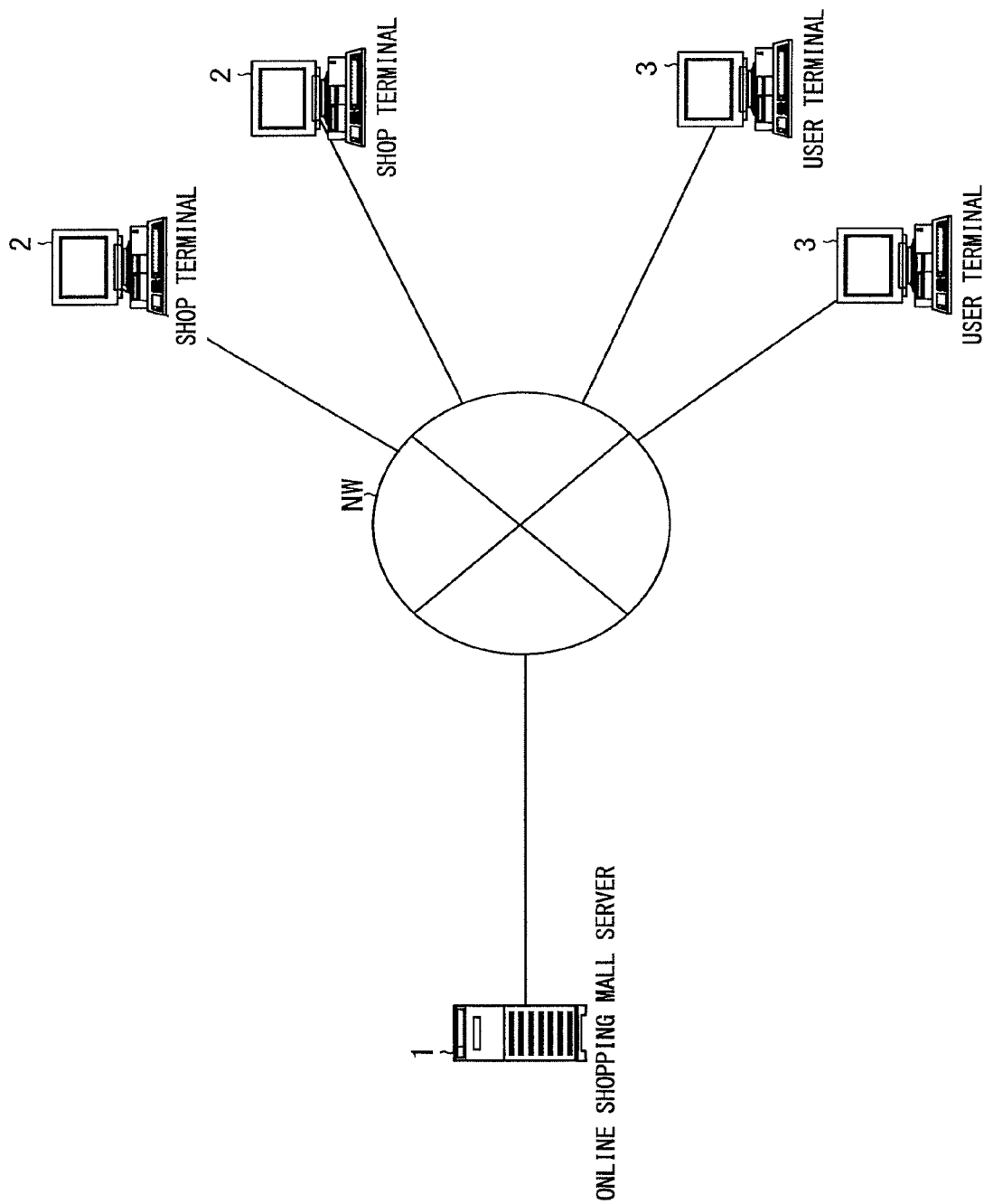
FIG. 1 is a diagram showing an example of a schematic configuration of an information processing system S according to an embodiment.

1. First Embodiment 1-1. Schematic Configuration and Function of Information Processing System First, a configuration of an information processing system S according to the present embodiment will be described with reference to FIG. 1. FIG. 1 is a diagram showing an example of a schematic configuration of the information processing system S according to the present embodiment.

As shown in FIG. 1, the information processing system S includes an online shopping mall server 1, a plurality of shop terminals 2, and a plurality of user terminals 3. The online shopping mall server 1, each shop terminal 2, and each user terminal 3 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The online shopping mall server 1 is a server device that performs various processes related to an online shopping mall from which items for sale can be purchased. The online shopping mall server 1 is an example of an information processing apparatus of the present invention. A user can purchase a desired item for sale from a desired shop by using the online shopping mall. For example, the online shopping mall server 1 transmits a web page of the online shopping mall and performs processes related to a search and a purchase of an item for sale according to a request from the user terminal 3. The item for sale is an example of a search object of the present invention.

The shop terminal 2 is a terminal device used by an employee or the like of a shop that is open in the online shopping mall. The shop terminal 2 accesses a server device such as the online shopping mall server 1 on the basis of an operation from an employee or the like. Thereby, the shop terminal 2 receives a web page from the server device and displays the web page. In the shop terminal 2, software such as a browser and an email client is installed. For example, an employee registers information of an item for sale to be sold in the online shopping mall and checks content of order of an item for sale by using the shop terminal 2.

The user terminal 3 is a terminal device of a user who uses the online shopping mall. The user terminal 3 receives a web page from the online shopping mall server 1 and displays the web page by accessing the online shopping mall server 1 on the basis of an operation from a user. In the user terminal 3, software such as a browser and an email client is installed. For example, a personal computer, a PDA (Personal Digital Assistant), a mobile information terminal such as a smartphone, and a mobile phone are used as the user terminal 3.

1-2. Presentation of Attribute Value

Next, a presentation of an attribute value on the basis of a keyword inputted by a user will be described with reference to FIGS. 2 to 6.

Items for sale sold in the online shopping mall are categorized by a shop that sells the items for sale. A category of an item for sale is a division of the item for sale when the item for sale is classified on the basis of a predetermined criterion. The category may be referred to as a genre. For example, an item for sale is classified by the type of the item for sale. A category name that is a name of a category is, for example, a common noun. The categories of items for sale are hierarchically defined by a tree structure. In the tree structure, a category corresponding to a child of a certain category is referred to as a "child category". A category corresponding to a descendant of a certain category is referred to as a "descendant category". A category corresponding to a parent of a certain category is referred to as a "parent category". For example, there are categories such as "food", "water/soft drink", "wine", and "sake/shochu" as the highest categories. As child categories of the "sake/shochu", for example, there are "shochu", "sake", "plum liquor", and the like. The category of items for sale is an example of a search object division of the present invention.

As divisions of items for sale, there are a brand and a topic in addition to the category. The brand shows the source (for example, producer or seller) of an item for sale. A brand name is basically a proper noun. The topic indicates, for example, the subject of an item for sale and an event in which the item for sale is used. For example, as topic names, there are a "Mother's Day special", a "free shipping", and the like. For example, the topic may be defined for each category.

Each item for sale has attributes. The attribute is defined with an attribute name and an attribute value. The attribute name is a name of the attribute. The attribute name indicates an item or a type of the attribute. An attribute of an item for sale has an attribute value corresponding to the attribute name. For example, as attributes common to all items for sale, there are a sale item name and a price. The attribute value of the sale item name is a character string representing the name of the item for sale. The attribute value of the price is a numerical value representing the amount of money.

There may be an attribute corresponding to a category among attributes of items for sale. The online shopping mall server 1 stores combinations of an attribute name and attribute values of an attribute corresponding to a category. FIG. 2 is a diagram showing an example of category names, attribute names, and attribute values. As shown in FIG. 2, as category names, for example, there are "sake", "mineral water", "handbag", "router" of PC/peripheral device, and "router" of electric drill. As attribute names of "sake" and "mineral water", for example, there are "production area" and "inner capacity". In this way, even in different categories, the same attribute item may be defined. As attribute values of "production area", for example, there are "Chugoku", "Chubu", and "Kanto". As attribute values of "inner capacity" of "sake", for example, there are "500", "750", and "1000". As attribute values of "inner capacity" of "mineral water", for example, there are "350", "500", and "1000". In this way, even in the same attribute item, there may be different attribute values according to a category. The reason of this is that the attribute value held by an item for sale may vary according to a category. As attribute names of handbag, for example, there are "brand", "color", and the like. As attribute names of router of electric drill, for example, there are "number of revolutions", and the like. As attribute names of "router" of PC/peripheral device, for example, there are "transfer speed", and the like.

While a user is inputting a plurality of keywords as a search condition, the online shopping mall server 1 causes the user terminal 3 to present the user with combinations of a category name, an attribute name, and an attribute value which are suitable for the keywords that are being inputted. Thereby, the online shopping mall server 1 provides a function of, for example, a faceted navigation or a faceted search. In this case, the attribute item is a facet and the attribute name indicates a facet. The attribute value is a facet value. The keyword is an example of a search word of the present invention.

Figure 3:
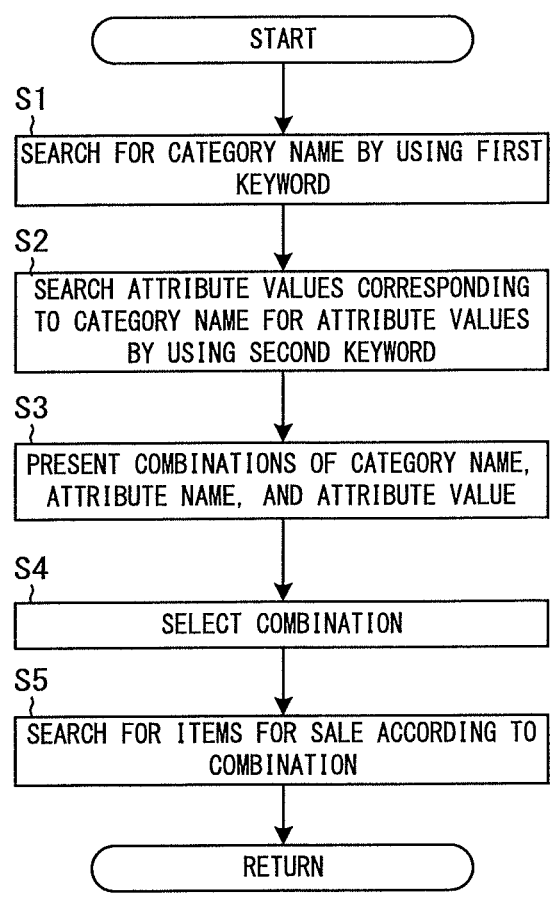
FIG. 3 is a flowchart showing an example of a process overview of the information processing system S according to the embodiment.

FIG. 3 is a flowchart showing an example of a process overview of the information processing system S according to the present embodiment. As shown in FIG. 3, the online shopping moll server 1 searches for a category name suitable for a first keyword of two or more keywords that are being inputted (step S1). The category name suitable for the keyword may be, for example, at least one of a category name identical to the keyword and a category name partially identical to the keyword. Further, the category name suitable for the keyword may be, for example, a category whose front part identical to the keyword and/or a category name whose back part identical to the keyword. The first keyword is an example of a first search word of the present invention.

Next, the online shopping mall server 1 searches attribute values corresponding to the category name found by the first keyword for attribute values suitable for a second keyword (step S2). An attribute value suitable for a keyword may be, for example, at least one of an attribute value identical to the keyword and an attribute value partially identical to the keyword. Further, an attribute value suitable for a keyword may be, for example, an attribute value whose front part identical to the keyword and/or an attribute whose back part identical to the keyword. Further, an attribute value whose notation is different from that of a keyword but whose meaning is the same as that of the keyword may be included in an attribute value suitable for the keyword may be. For example, "red" written in a Chinese character, "red" written in hiragana characters, "red" written in katakana characters, "red" written in English, and a color code "ff0000" have the same meaning. The second keyword is an example of a second search word of the present invention.

Next, by the control of the online shopping mall server 1, the user terminal 3 presents the user with combinations of the found category name, an attribute name corresponding to the found attribute value, and the found attribute value as candidates for a search condition (step S3).

When the user terminal 3 detects that the user selects any combination from the one or more presented combinations (step S4), the online shopping mall server 1 searches for items for sale according to the selected combination (step S5). Specifically, the online shopping mall server 1 searches items for sale in the category indicated by the category name included in the selected combination for items for sale whose attribute value of the attribute indicated by the attribute name included in the selected combination corresponds with the attribute value included in the selected combination.

Figure 4:
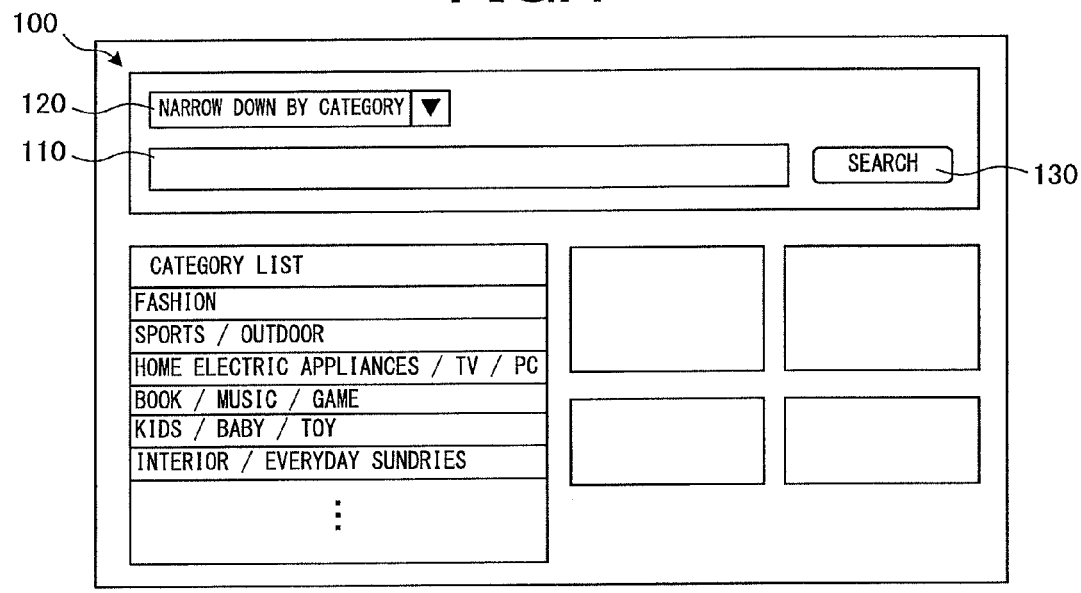
FIG. 4 is a diagram showing a screen display example of a top page of an online shopping mall.

A specific example will be described below. FIG. 4 is a diagram showing a display example of a top page of the online shopping mall. The top page is a web page located at the highest level in the online shopping mall. As shown in FIG. 4, the top page includes a search condition setting area 100. The search condition setting area 100 is an area in which widgets and the like to specify a search condition are displayed. Specifically, the search condition setting area 100 includes a keyword input field 110, a category selection menu 120, a search button 130, and the like. The keyword input field 110 is an area for inputting a keyword. A user can input a plurality of keywords by inputting spaces as a separator between keywords. The category selection menu 120 is a pull-down menu for selecting a category to be specified as a search condition. When the search button 130 is selected, the online shopping mall server 1 searches for items for sale whose text information such as the sale item name and the sale item description includes the keyword inputted in the keyword input field 110. When a category is selected from the category selection menu 120, the online shopping mall server 1 searches items for sale included in the selected category for items for sale by using the inputted keyword. A state in which the user is inputting keywords is, for example, a state in which the user neither selects the search button 130 nor selects a candidate for search condition from a proposal area 200 described later from when the user starts inputting the keywords in the keyword input field 110.

Figure 5A:
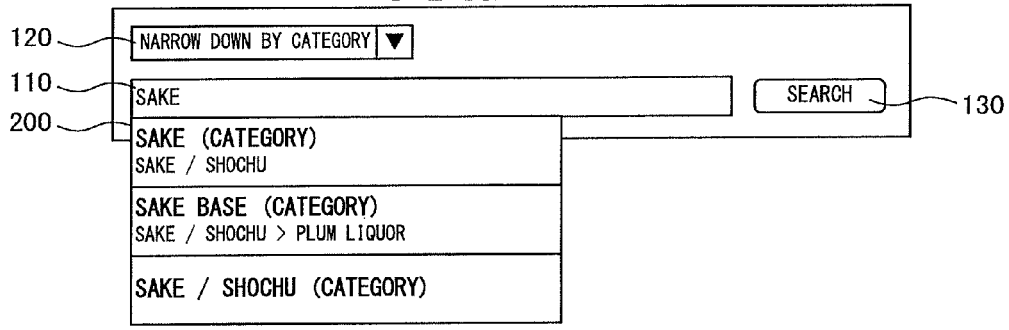
FIG. 5A is a diagram showing a presentation example of category names.
Figure 5B:
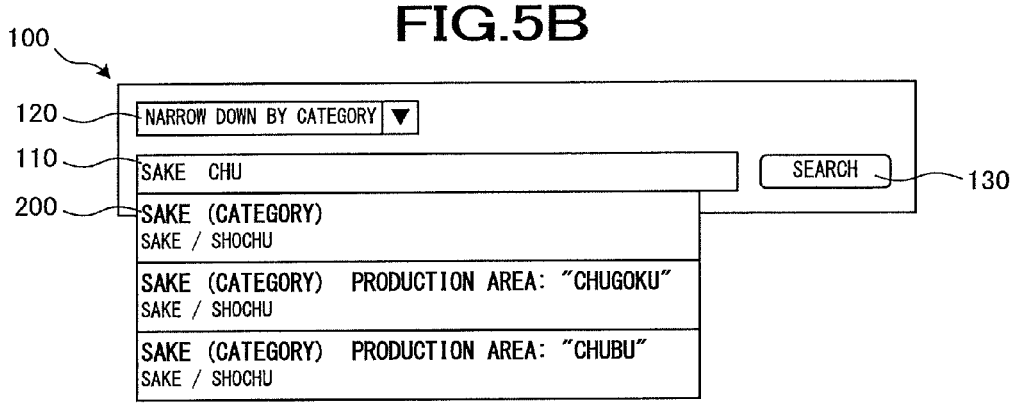
FIG. 5B is a diagram showing a presentation example of combinations of a category name, an attribute name, and an attribute value.
Figure 5C:
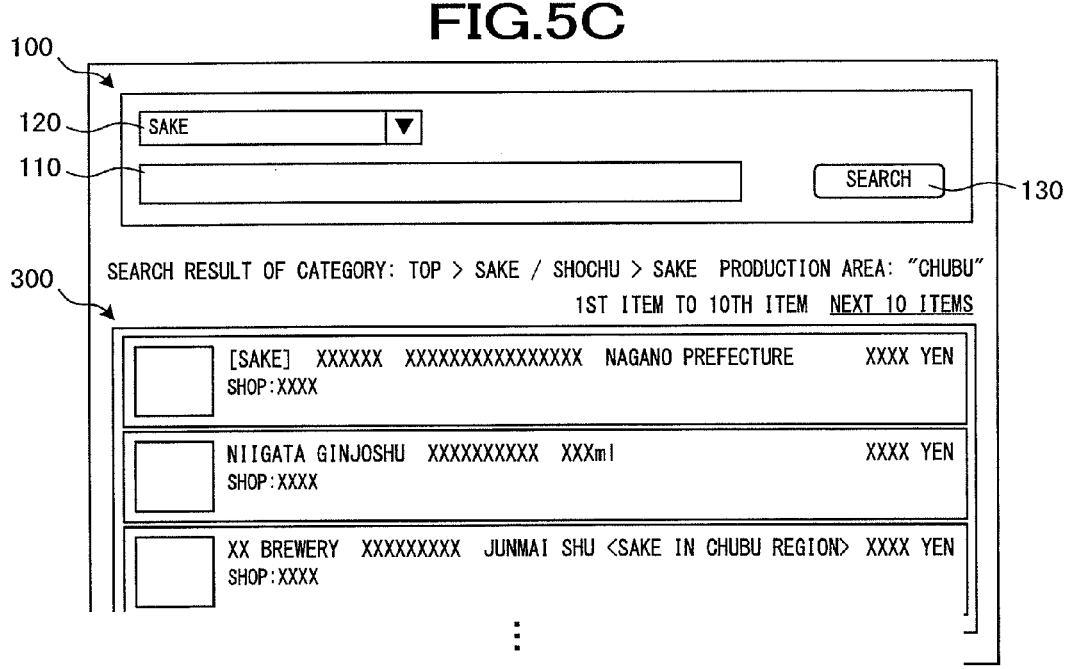
FIG. 5C is a diagram showing a display example of a search result page.

FIG. 5A is a diagram showing a presentation example of category names. FIG. 5B is a diagram showing a presentation example of combinations of a category name, an attribute name, and an attribute value. FIG. 5C is a diagram showing a display example of a search result page. When there are category names suitable for the first keyword of one or more keywords that are being inputted in the keyword input field 110, as shown in FIG. 5A, the proposal area 200 is displayed in the top page. The proposal area 200 is an area in which a category name or a combination of a category name, an attribute name, and an attribute value is displayed as a candidate for a search condition. When only one keyword is inputted, a category name suitable for the first keyword is displayed in the proposal area 200. For example, "sake" is inputted. Then, category names such as "sake", "sake base", and "sake/shochu" are displayed in the proposal area 200. Further, under each of these category names, a category name of the parent category of the category indicated by each of these category names is displayed. At this time, if the user selects any one of the category names from the proposal area 200, the online shopping mall server 1 searches for items for sale included in the category indicated by the selected category name.

When there is no category name suitable for the first keyword inputted in the keyword input field 110 and there is at least either one of a brand name and a topic name suitable for the first keyword, the brand name or the topic name suitable for the first keyword is displayed in the proposal area 200. For example, when the keyword is "AB", a brand name "ABC" is displayed, and when the keyword is "Mother's", a topic name "Mother's Day special" is displayed. At this time, if the user selects the brand name from the proposal area 200, a brand page of the brand indicated by the selected brand name is displayed on a screen of the user terminal 3. The brand page is a web page in which information of a specific brand is displayed. Further, the brand page is a web page for a user to specify a search condition to search for desired items for sale from among items for sale of a specific brand. When the user selects the topic name from the proposal area 200, a topic page of the topic indicated by the selected topic name is displayed on the screen of the user terminal 3. The topic page is a web page in which information of a specific topic is displayed. Further, the topic page is a web page to specify a search condition to search for items for sale related to a specific topic. If the user selects a link or the like to specify a search condition in the brand page or the topic page, the online shopping mall server 1 may search for items for sale by using, for example, a keyword indicating the specified search condition. Further, the online shopping mall server 1 may search for items for sale by using, for example, an attribute item and an attribute value according to the specified search condition. When there is a category related to the brand or the topic, the online shopping mall server 1 may search for items for sale by using, for example, a category corresponding to the specified search condition. In this way, it becomes easy to search for items for sale of a brand or items for sale related to a topic on the basis that the user inputs the first keyword.

It is assumed that the user continues inputting keywords on the top page and the second keyword is inputted in the keyword input field 110. When there is an attribute value suitable for the second keyword among attribute values corresponding to the category name suitable for the first keyword, a combination of the category name, the attribute name, and the attribute value is displayed in the proposal area 200. For example, "Chu" is further inputted in the keyword input field 110. As a result, "sake Chu" is inputted in the keyword input field 110. Then, as shown in FIG. 5B, in the proposal area 200, the category name "sake" is displayed and a combination of "sake", "production area", and "Chugoku" and a combination of "sake", "production area", and "Chubu" are displayed. Although "mineral water" has the attribute name "production area", "mineral water" is not suitable for the first keyword. Therefore, no combination related to "mineral water" is displayed. In FIG. 5B, no information related to "sake base" or "sake/shochu" is displayed. If there is an attribute value including "Chu" in these categories, a combination related to "sake base" or "sake/shochu" is displayed.

The user can know what attribute name of attribute exists for items for sale in a category indicated by a category name suitable for the first keyword and what attribute value exists according to the attribute. Further, the user can know combinations of an attribute name and an attribute value by a simple operation of inputting two keywords.

Here, it is assumed that the user selects the combination of "sake", "production area", and "Chubu" from the proposal area 200. Then, the online shopping mall server 1 searches for items for sale. As a result, a search result page is displayed on the screen of the user terminal 3. The search result page is a web page on which the search result of the items for sale is displayed. As shown in FIG. 5C, the search result page includes a search condition setting area 100 and a search result display area 300, and the like. In the search condition setting area 100, for example, the user can specify a search condition to narrow down found items for sale. In the search result display area 300, a list of the found items for sale is displayed. For example, a sale item name, an image, a price, and a shop of the found items for sale are displayed. When the user selects any one of the items for sale from the search result display area 300, a sale item page of the selected item for sale is displayed on the screen of the user terminal 3. The sale item page is a web page in which detailed information of a specific item for sale is displayed. The user can perform an operation to purchase the item for sale on the sale item page.

In the search result display area 300 shown in FIG. 5C, a list of items for sale is displayed whose "production area" is "Chubu" among items for sale included in the category of "sake". An item for sale where the attribute value of "production area" is not "Chubu" is not searched for even if text information of the sale item name and/or the sale item description of the item for sale includes a word "Chubu" (or both of "production area" and "Chubu"). Therefore, it is possible to reliably search for items for sale having an attribute desired by the user and it is also possible to prevent items for sale other than items for sale having an attribute desired by the user from being searched for.

Figure 6A:
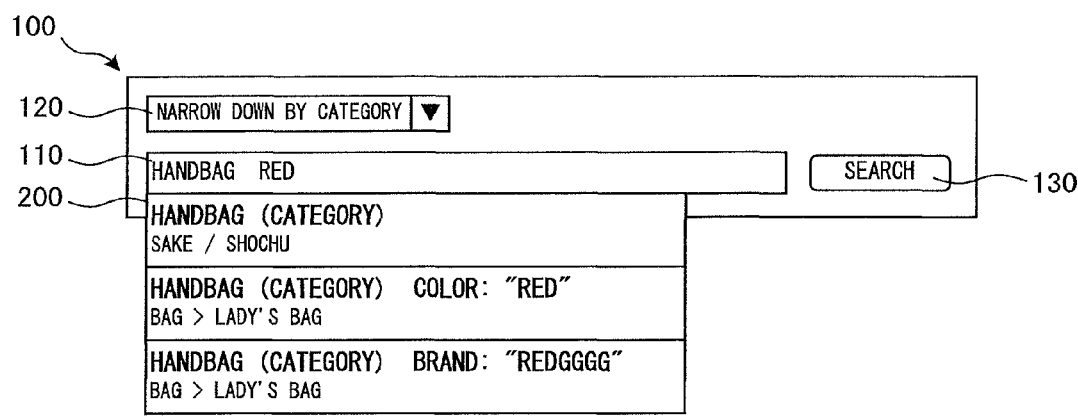
FIGS. 6A and 6B are diagrams showing a presentation example of combinations of a category name, an attribute name, and an attribute value.
Figure 6B:
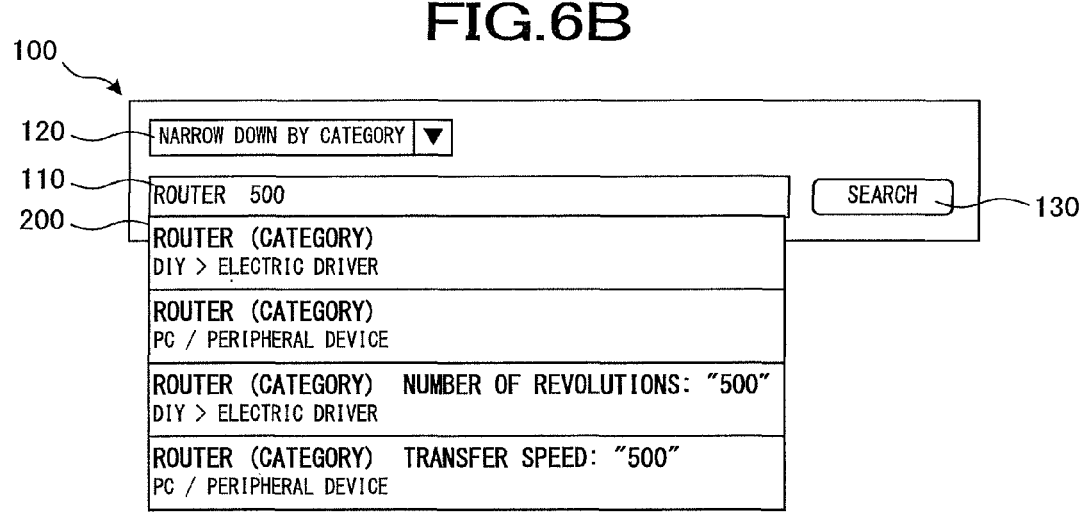

FIGS. 5A to 5C are an example of displaying combinations including the same category name, the same attribute name, and an attribute value different from each other. FIGS. 6A and 6B are diagrams showing other presentation examples of combinations of a category name, an attribute name, and an attribute value. As shown in FIG. 2, as attribute values of "brand" of "handbag", for example, there are "ABC", "DEF", and "REDGGGG". Further, as attribute values of "color" of "handbag", for example, there are "red", "white", "blue", and "black". For example, the user inputs "handbag red" in the keyword input field 110. Then, as shown in FIG. 6A, in the proposal area 200, the category name "handbag" is displayed and a combination of "handbag", "color", and "red" and a combination of "handbag", "brand", and "REDGGGG" are displayed. In this manner, combinations whose category name is the same but whose attribute values are different from each other may be displayed.

As shown in FIG. 2, as "number of revolutions" of "router" of electric drill, for example, there are "400", "500", and "600", and as "transfer speed" of "router" of PC/peripheral device, for example, there are "100", "500", and "1000". For example, the user inputs "router 500" in the keyword input field 110. Then, as shown in FIG. 6B, in the proposal area 200, the category name "router" of electric drill and the category name "router" of PC/peripheral device are displayed and a combination of "router" of electric drill, "number of revolutions", and "500" and a combination of "router" of PC/peripheral device, "transfer speed", and "500" are displayed. In this manner, combinations whose category names are different from each other may be displayed.

A method in which when three or more keywords are inputted in the keyword input field 110, the online shopping mall server 1 handles the third and the following keywords is freely determined by an administrator of the online shopping mall. For example, if there is an attribute value suitable for one of the third and the following keywords among attribute values corresponding to the category name suitable for the first keyword, the online shopping mall server 1 may perform control so that a combination of an attribute name and the attribute value is additionally displayed in the proposal area 200. In this case, a plurality of combinations of an attribute name and the attribute value are included in one combination. For example, when the user inputs keywords "sake Chubu 5", a combination including a combination of "sake", "production area", and "Chubu" and a combination of "inner capacity" and "500" is displayed in the proposal area 200. When the user selects this combination, the online shopping mall server 1 searches for items for sale whose "production area" is "Chubu" and whose "inner capacity" is "500" from among items for sale included in the category of "sake".

The online shopping mall server 1 may use the third and the following keywords in a keyword search. For example, when the user inputs a keywords "sake Chubu ginjo" and thereafter the user selects a combination of "sake", "production area", and "Chubu" from the proposal area 200, the online shopping mall server 1 searches for items for sale whose "production area" is "Chubu" and whose sale item name and/or sale item description includes "ginjo" from among items for sale included in the category of "sake".

The online shopping mall server 1 may perform control so that a combination of an attribute name and an attribute value is displayed in the proposal area 200 but no category name is displayed. The online shopping mall server 1 may perform control so that a combination of a category name and an attribute value is displayed in the proposal area 200 but no attribute name is displayed. For example, a combination of "router" and "500 Mbps" may be displayed. Also in these cases, the search method of the online shopping mall server 1 when a combination is selected by the user is the same as described above.

For example, the online shopping mall server 1 may search for a category name suitable for the second keyword and searches for an attribute value suitable for the first keyword from among attribute values corresponding to the found category name. A criterion to divide the divisions of items for sale is freely determined by an administrator. As a result, the name of the division, which may be a category, a genre, and the like, is freely determined by the administrator. Further, whether or not attribute names and attribute values of attributes common to all items for sale, such as a sale item name and a price, are displayed in the proposal area 200 is freely determined by the administrator.

When the user selects a category from the category selection menu 120 and selects the search button 130 in the top page, the online shopping mall server 1 searches for items for sale from among items for sale included in the selected category by using inputted keywords. A list of categories is also displayed in the top page. A list of categories may also be displayed in the search result page. When the user selects a desired category from the list of categories, the online shopping mall server 1 searches for items for sale included in the selected category. In the search result page displayed in these cases, if the user inputs keywords in the keyword input field 110 and selects the search button 130, the online shopping mall server 1 assumes that the previously selected category is a category that has already been selected as the current search condition. Therefore, the online shopping mall server 1 searches for items for sale from among items for sale included in the category that has already been selected by using the inputted keywords. It is assumed that the user is inputting keywords in the keyword input field 110 on the search result page in a state in which the category has already been selected. In this case, the online shopping mall server 1 may search for, for example, an attribute value suitable for the first keyword from among attribute values corresponding to the category name of the category that has already been selected regardless of whether the number of the keywords that are being inputted is one or two or more. Then, the online shopping mall server 1 may cause the user terminal 3 to present the found attribute value as a candidate for the search condition. For example, when the user selects "sake/shochu" from the list of categories in the top page, items for sale included in "sake/shochu" are searched for and a search result page is displayed. Next, when the user selects "sake" from the list of categories in the search result page, items for sale included in "sake" are searched for and a search result page is displayed. Next, the user inputs "Chu" in the keyword input field 110 in the search result page. At this time, "sake" is already selected as the category, so that the online shopping mall server 1 acquires "Chugoku" and "Chubu" as attribute values corresponding to "sake". Then, in the proposal area 200, for example, "production area Chugoku" and "production area Chubu" are displayed. In this manner, when the user inputs one keyword, it is possible to obtain the same effect as that when the user inputs two or more keywords on the top page.

1-3. Configuration of Online Shopping Mall Server

Next, a configuration of the online shopping mall server 1 will be described with reference to FIGS. 7 and 8A to 8C.

Figure 7:
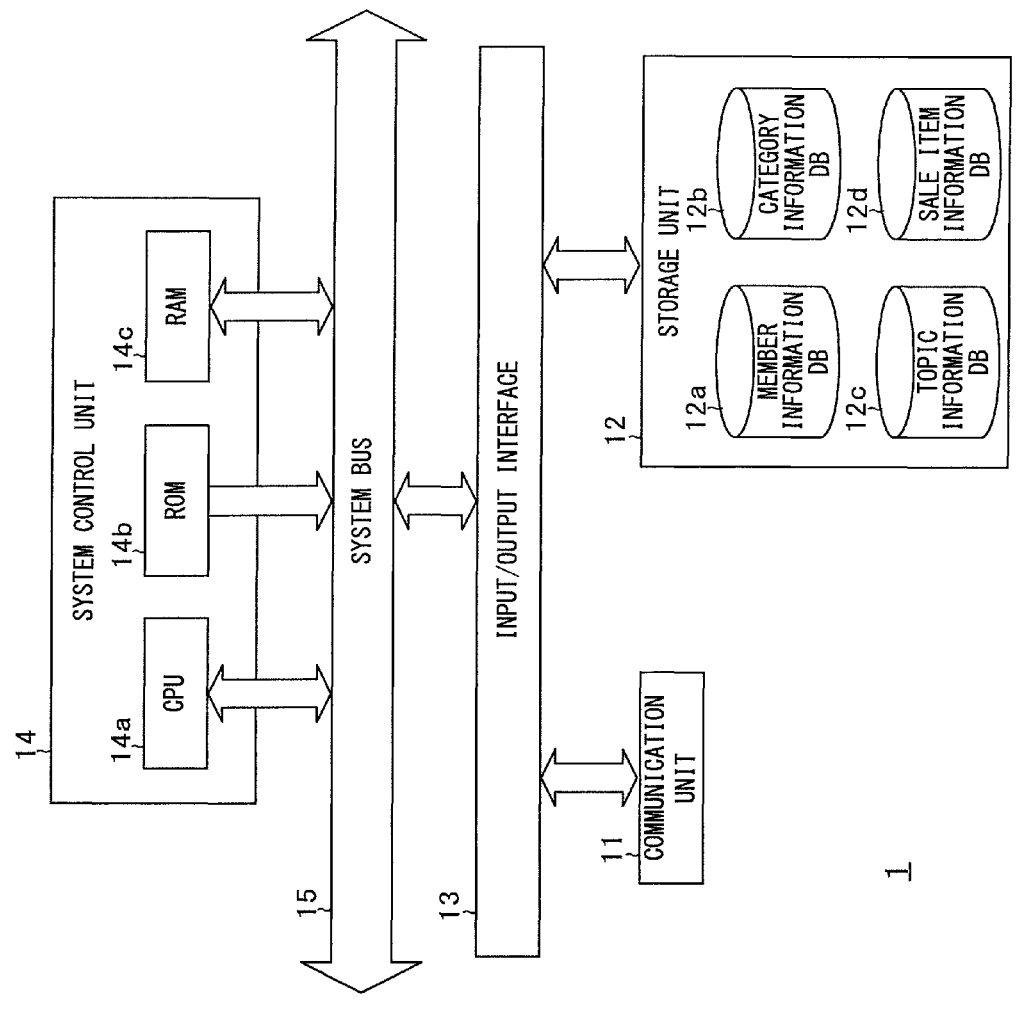
FIG. 7 is a block diagram showing an example of a schematic configuration of an online shopping mall server 1 according to the embodiment.

FIG. 7 is a block diagram showing an example of a schematic configuration of the online shopping mall server 1 according to the present embodiment. As shown in FIG. 7, the online shopping mall server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the shop terminal 2 and the user terminal 3.

The storage unit 12 includes, for example, a hard disk drive and the like. The storage unit 12 is an example of a storage means of the present invention. In the storage unit 12, databases such as a member information DB 12a, a category information DB 12b, a topic information DB 12c, and a sale item information DB 12*d* are constructed. The "DB" is an abbreviation of database.

FIG. 8A is a diagram showing an example of content registered in the member information DB 12*a*. In the member information DB 12*a*, member information related to users registered in the information processing system S as a member is registered. Specifically, in the member information DB 12*a*, user attributes such as a user ID, a password, a nickname, a name, a date of birth, a gender, a postal code, an address, a phone number, and an email address are registered in association with each other for each user.

FIG. 8B is a diagram showing an example of content registered in the category information DB 12*b*. In the category information DB 12*b*, category information related to categories of items for sale is registered. Specifically, in the category information DB 12*b*, attributes of a category such as a category ID, a category name, a level of the category, a parent category ID, a child category ID list, and one or more pieces of attribute information are registered in association with each other for each category. For example, the category information is set by an administrator of the online shopping mall.

The category ID is identification information of the category defined by the category information. The level of the category indicates the depth of the layer of the category. For example, the level of the highest category is 1. The deeper the layer is, the greater the value of the level is. The parent category ID is a category ID of the parent category of the category indicated by the category ID. The child category ID list is a list of category IDs of child categories of the category indicated by the category ID. The child category ID list is set when the category indicated by the category ID has one or more child categories.

FIG. 8C is information showing an example of content set in the attribute information. The attribute information is information of attributes held by an item for sale included in the category indicated by the category ID. As shown in FIG. 8C, in the attribute information, an attribute ID, an attribute name, and one or more attribute values are set in association with each other for each attribute item. The attribute ID is identification information of the attribute item. In the attribute information, attribute values, in the attribute item indicated by the attribute name, are registered which may be held by items for sale in the category indicated by the category ID. For example, the attribute values included in the attribute information may be inputted by an administrator or may be automatically registered by the online shopping mall server 1. For example, the system control unit 14 may add attribute values included in sale item information registered in the sale item information DB 12*d* into the attribute information.

FIG. 8D is a diagram showing an example of content registered in the topic information DB 12*c*. In the topic information DB 12*c*, topic information related to a topic is registered. Specifically, in the topic information DB 12*c*, a topic ID, a topic name, and the like are registered in association with each other for each topic. The topic ID is identification information of the topic.

FIG. 8E is a diagram showing an example of content registered in the sale item information DB 12*d*. In the sale item information DB 12*d*, sale item information related to items for sale sold in the online shopping mall is registered. The sale item information is information registered by a shop. Specifically, in the sale item information DB 12*d*, a shop ID, a sale item ID, a product code, a category ID, a sale item name, a URL of a sale item image, a sale item description, a sale item price, one or more attribute values according to the category, and the like are registered in association with each other for each item for sale sold by the shop. The shop ID is identification information of the shop which sells the item for sale. The sale item ID is identification information of an item for sale for the shop to manage the item for sale sold by the shop. The product code is a code number to identify the item for sale. When the same items for sale are sold by a plurality of shops, the same product code is given to each item for sale. As a product code, for example, there is JAN code (Japanese Article Number Code). The category ID indicates a category to which the item for sale belongs. The category ID set in the sale item information is basically a category ID of a category of the deepest layer. In other words, a category ID of the most subdivided category is set. The sale item name is a name of the item for sale given by the shop.

The attribute values according to the category are registered corresponding to the attribute information set in the category information, corresponding to the category ID, in the category information DB 12*b*. For example, when the first attribute information of "sake" is attribute information related to "production area" and the second attribute information of "sake" is attribute information related to "inner capacity", the first attribute value set in the sale item information as the attribute value according to the category is an attribute value of "production area" and the second attribute value is an attribute value of "inner capacity". For example, the attribute values in the sale item information may be inputted by the shop or may be automatically registered by the online shopping mall server 1. For example, the system control unit 14 may analyze a sale item name and a sale item description in registered sale item information and thereby acquire attribute values from the sale item name and the sale item description and register the attribute values.

Next, other information stored in the storage unit 12 will be described. The storage unit 12 stores various data for displaying webpages, such as an HTML (HyperText Markup Language) documents, an XML (Extensible Markup Language) documents, image data, text data, and an electronic documents, which. The storage unit 12 also stores various setting values.

Further, the storage unit 12 stores various programs such as an operating system, a WWW (World Wide Web) server program, a DBMS (Database Management System), and an electronic commerce management program. The electronic commerce management program is a program for performing various processes related to the electronic commerce. The electronic commerce management program is an example of an information processing program of the present invention. For example, the various programs may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

Figure 9:
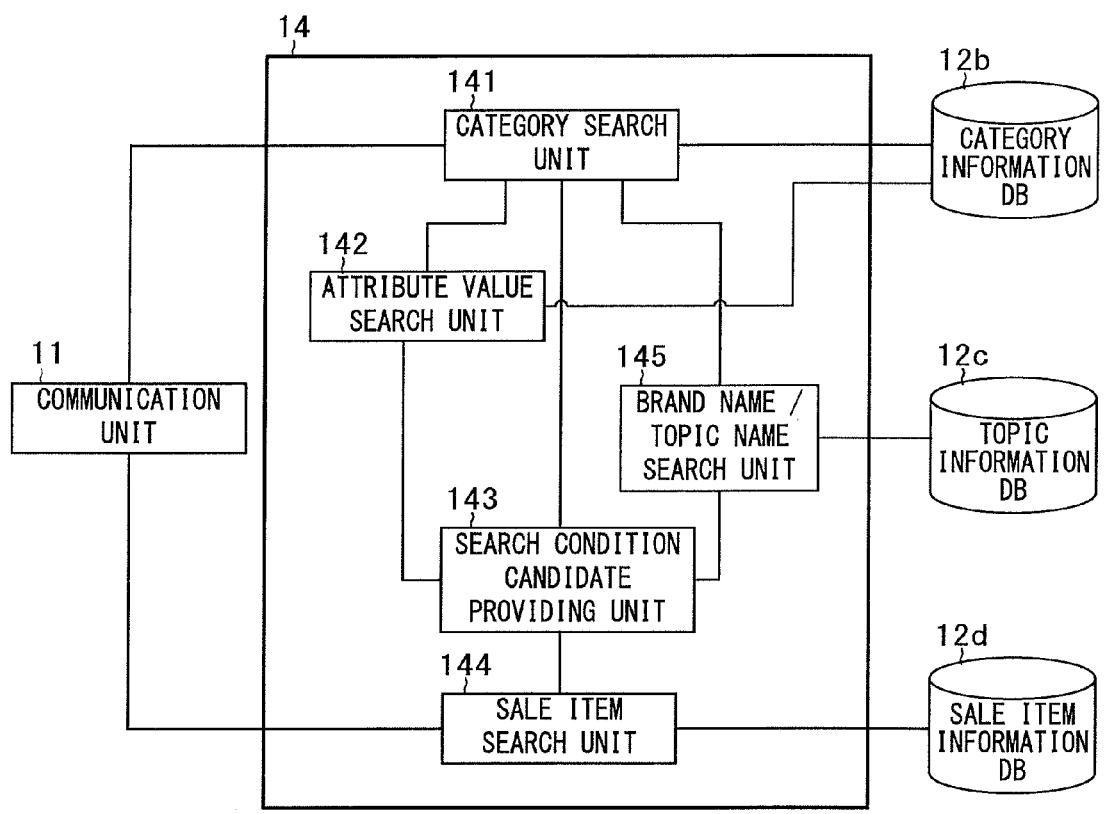
FIG. 9 is a diagram showing an example of functional blocks of the online shopping mall server 1 according to the embodiment.

FIG. 9 is a block diagram showing an example of functional blocks of the online shopping mall server 1 according to the present embodiment. The system control unit 14 includes a CPU 14*a*, a ROM (Read Only Memory) 14*b*, a RAM (Random Access Memory) 14*c*, and the like. In the system control unit 14, the CPU 14*a* reads and executes various programs, so that the system control unit 14 functions as a category search unit 141, an attribute value search unit 142, a search condition candidate providing unit 143, a sale item search unit 144, and a brand name/topic name search unit 145 as shown in FIG. 9. The category search unit 141 is an example of a division identification means of the present invention. The attribute value search unit 142 is an example of an attribute value acquisition means of the present invention. The search condition candidate providing unit 143 is an example of a presentation control means and a number acquisition means of the present invention. The sale item search unit 144 is an example of an object search means of the present invention.

When there are two or more keywords that are being inputted in the keyword input field 110 by a user, the category search unit 141 searches for a category name suitable for the first keyword of the key words that are being inputted from the category information DB 12*b*. Thereby, the category search unit 141 identifies a category suitable for the first keyword. The attribute value search unit 142 acquires, from the category information DB 12*b*, attribute values suitable for the second keyword of the key words that are being inputted in the keyword input field 110 among attribute values associated with the category name found by the category search unit 141. The search condition candidate providing unit 143 causes the user terminal 3 to display the attribute values acquired by the attribute value search unit 142 in the proposal area 200 as candidates for a search condition. The search condition candidate providing unit 143 determines the priority of display of the attribute values. The sale item search unit 144 searches for items for sale on the basis of a search condition specified by the user. Specifying the search condition includes selecting any one of attribute values from the proposal area 200. The brand name/topic name search unit 145 searches for brand names and topic names suitable for the first keyword of the keywords that are being inputted in the keyword input field 110 by the user.

The online shopping mall server 1 may include a plurality of server devices. For example, a server device that performs processing such as searching for items for sale and ordering an item for sale in the online shopping mall, a server device that controls presentation of a combination of an attribute name and an attribute value, a server device that transmits a web page according to a request from the user terminal 3, a server device that manages databases, and the like may be connected to each other by a LAN or the like.

1-4. Operation of Information Processing System

Next, an operation of the information processing system S will be described with reference to FIGS. 10A and 10B and 11.

Figure 10A:
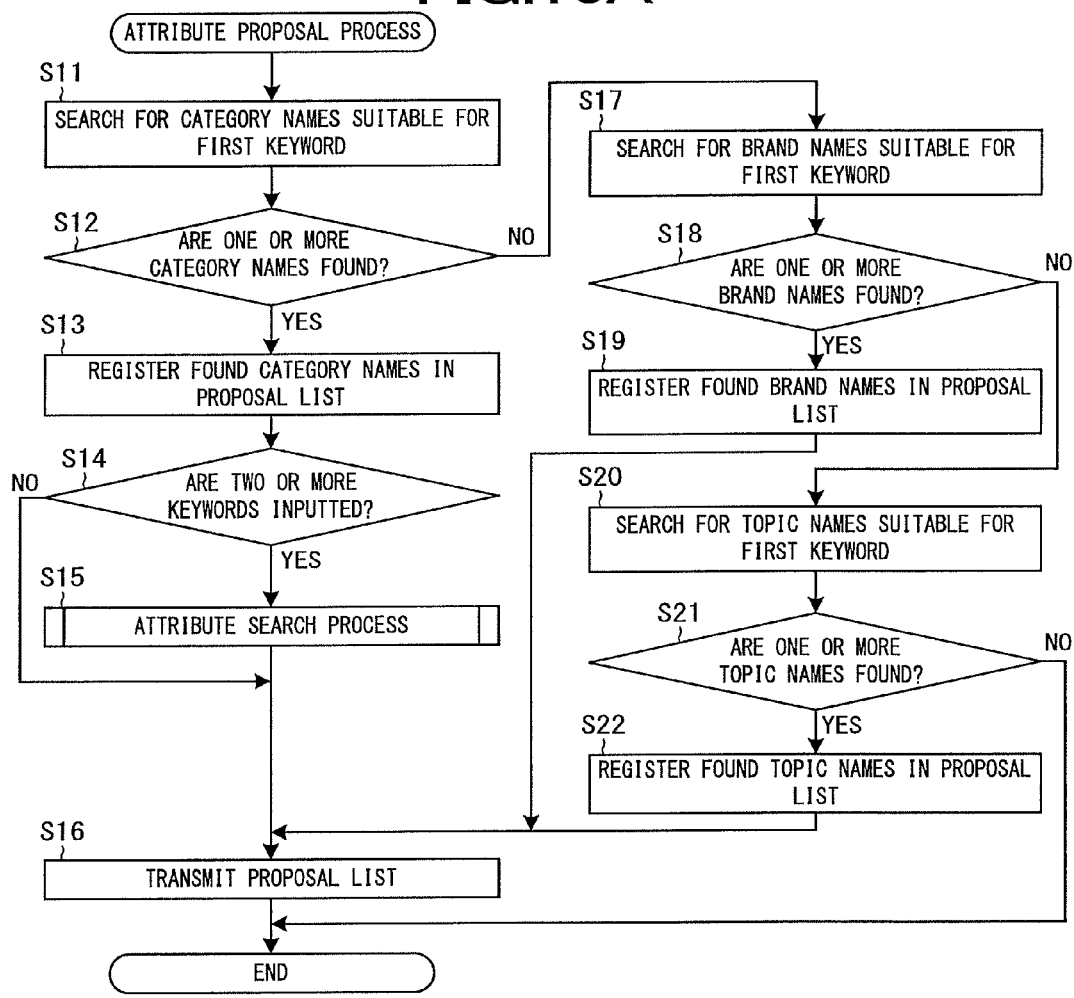
FIG. 10A is a flowchart showing a process example of an attribute proposal process of the system control unit 14 of the online shopping mall server 1 according to the embodiment.
Figure 10B:
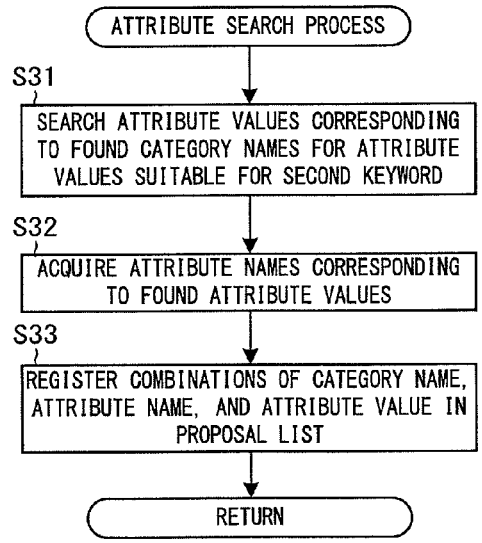
FIG. 10B is a flowchart showing a process example of an attribute search process of the system control unit 14 of the online shopping mall server 1 according to the embodiment.

FIG. 10A is a flowchart showing a process example of an attribute proposal process of the system control unit 14 of the online shopping mall server 1 according to the present embodiment. For example, every time a user inputs a character in the keyword input field 110 of the top page, the user terminal 3 transmits a character string inputted in the keyword input field 110 at that time to the online shopping mall server 1. The attribute proposal process is performed every time the online shopping mall server 1 receives a character string.

As shown in FIG. 10A, the category search unit 141 identifies a keyword from the received character string. Then, the category search unit 141 searches for category names suitable for the first keyword (step S11). For example, the category search unit 141 searches for category names including the first keyword from category names registered in the category information DB 12*b*. Next, the category search unit 141 determines whether or not one or more category names are found (step S12). At this time, if the category search unit 141 determines that one or more category names are found (step S12: YES), the category search unit 141 proceeds to step S13. On the other hand, if the category search unit 141 determines that no category name is found (step S12: NO), the category search unit 141 proceeds to step S17.

In step S13, the search condition candidate providing unit 143 registers the found category names and category IDs corresponding to the category names in a proposal list. The proposal list is a list of information displayed in the proposal area 200. Next, the attribute value search unit 142 determines whether or not two or more keywords are inputted on the basis of the received character string (step S14). At this time, if the attribute value search unit 142 determines that two or more keywords are inputted (step S14: YES), the attribute value search unit 142 proceeds to step S15. On the other hand, if the attribute value search unit 142 determines that only one keyword is inputted (step S14: NO), the attribute value search unit 142 proceeds to step S16.

In step S15, the attribute value search unit 142 performs an attribute search process. FIG. 10B is a flowchart showing a process example of the attribute search process of the system control unit 14 of the online shopping mall server 1 according to the present embodiment. As shown in FIG. 10B, the attribute value search unit 142 searches attribute values corresponding to the found category names for attribute values suitable for the second keyword (step S31). Specifically, the attribute value search unit 142 acquires attribute information from category information including a found category name. Next, for example, the attribute value search unit 142 searches for attribute values including the second keyword from attribute values included in the acquired attribute information. At this time, according to the acquired attribute information, the attribute value search unit 142 acquires, for example, words whose meaning is the same as that of the second keyword and whose notation is different from that of the second keyword. Then, the attribute value search unit 142 searches for attribute values that include the second keyword or any one of the words whose notation is different from that of the second keyword.

Next, the attribute value search unit 142 acquires attribute names corresponding to the found attribute values from the attribute information (step S32). Next, the search condition candidate providing unit 143 registers a combination of a category name corresponding to the attribute value, a category ID corresponding to the category name, the attribute name, an attribute ID corresponding to the attribute name, and the attribute value in the proposal list for each found attribute value (step S33). After completing this process, the search condition candidate providing unit 143 ends the attribute search process.

After completing the attribute search process, as shown in FIG. 10A, the search condition candidate providing unit 143 transmits the proposal list to the user terminal 3 which has transmitted the character string (step S16). After completing this process, the search condition candidate providing unit 143 ends the attribute proposal process.

In step S17, the brand name/topic name search unit 145 searches for brand names suitable for the first keyword. Specifically, the brand name/topic name search unit 145 searches for attribute information whose attribute name is "brand" from the category information DB 12*b*. Next, for example, the brand name/topic name search unit 145 searches for attribute values including the first keyword from attribute values included in the found attribute information. Next, the brand name/topic name search unit 145 determines whether or not one or more brand names are found (step S18). At this time, if the brand name/topic name search unit 145 determines that one or more brand names are found (step S18: YES), the brand name/topic name search unit 145 proceeds to step S19. On the other hand, if the brand name/topic name search unit 145 determines that no brand name is found (step S18: NO), the brand name/topic name search unit 145 proceeds to step S20.

In step S19, the search condition candidate providing unit 143 registers the found brand names and attribute IDs corresponding to the brand names in the proposal list. Next, the search condition candidate providing unit 143 proceeds to step S16.

In step S20, the brand name/topic name search unit 145 searches for topic names suitable for the first keyword. Specifically, the brand name/topic name search unit 145 searches for topic names including the first keyword from the topic information DB 12c. Next, the brand name/topic name search unit 145 determines whether or not one or more topic names are found (step S21). At this time, if the brand name/topic name search unit 145 determines that one or more topic names are found (step S21: YES), the brand name/topic name search unit 145 proceeds to step S22. On the other hand, if the brand name/topic name search unit 145 determines that no topic name is found (step S21: NO), the brand name/topic name search unit 145 ends the attribute proposal process.

In step S22, the search condition candidate providing unit 143 registers the found topic names and topic IDs corresponding to the topic names in the proposal list. Next, the search condition candidate providing unit 143 proceeds to step S16.

The user terminal 3 that receives the proposal list from the online shopping mall server 1 displays the proposal area 200 on the basis of the proposal list. When a category name is registered in the proposal list, the user terminal 3 displays the category name in the proposal area 200. When a combination of a category name, an attribute name, and an attribute value is registered in the proposal list, the user terminal 3 displays the combination in the proposal area 200. Thereby, for example, content as shown in FIG. 5A, 5B, 6A, or 6B is displayed on the screen of the user terminal 3. In this way, the system control unit 14 performs control to cause the user terminal 3 to display a combination of an attribute name and an attribute value. When a brand name or a topic name is registered in the proposal list, the user terminal 3 displays the brand name or the topic name in the proposal area 200.

Figure 11:
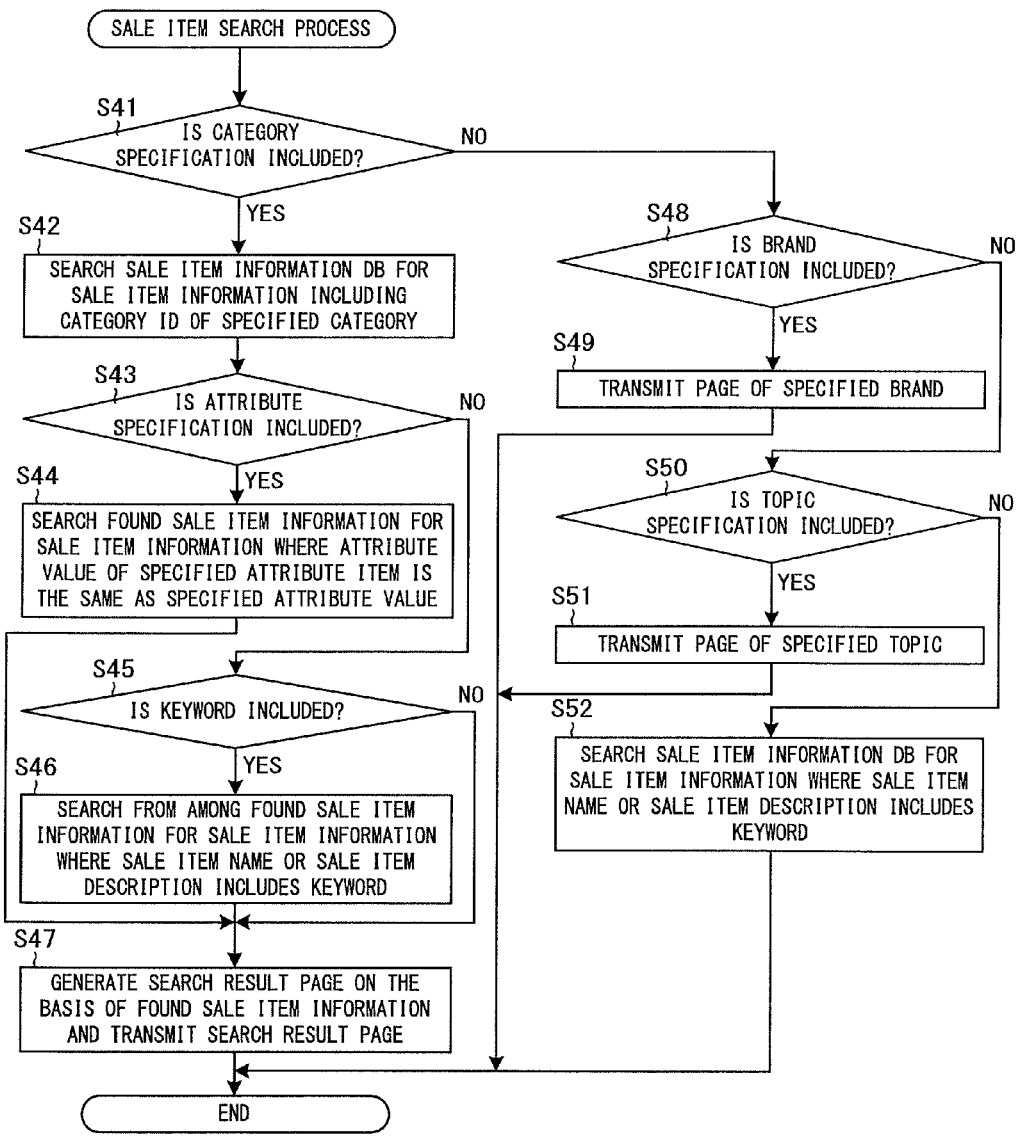
FIG. 11 is a flowchart showing a process example of a sale item search process of the system control unit 14 of the online shopping mall server 1 according to the embodiment.

FIG. 11 is a flowchart showing a process example of a sale item search process of the system control unit 14 of the online shopping mall server 1 according to the present embodiment. For example, when a user selects the search button 130 in the top page, the user terminal 3 transmits a search request to the online shopping mall server 1. In the search request in this case, the keywords inputted in the keyword input field 110 are set. When a category is selected from the category selection menu 120, the search request includes the inputted keywords and a category ID of the selected category. When the user selects something from the proposal area 200, the user terminal 3 transmits a search request. When the user selects a category name, the search request includes a category ID corresponding to the selected category name. When the user selects a combination of a category name, an attribute name, and an attribute value, the search request includes a category ID corresponding to the selected category name, an attribute ID corresponding to the selected attribute name, and the selected attribute value. When the user selects a brand name, the search request includes the selected brand name. When the user selects a topic name, the search request includes a topic ID corresponding to the selected topic name. The sale item search process is started when the online shopping mall server 1 receives a search request from the user terminal 3.

As shown in FIG. 11, the sale item search unit 144 determines whether or not the search request includes a category specification (step S41). When a category ID is set in the search request, the search request includes a category specification. If the sale item search unit 144 determines that the search request includes a category specification (step S41: YES), the sale item search unit 144 proceeds to step S42. On the other hand, if the sale item search unit 144 determines that the search request does not include a category specification (step S41: NO), the sale item search unit 144 proceeds to step S48.

In step S42, the sale item search unit 144 searches for sale item information of items for sale included in a category indicated by the category ID set in the search request from the sale item information DB 12d. Items for sale included in descendant categories of the category indicated by the category ID are also items for sale included in the category indicated by the category ID. The sale item search unit 144 can search for sale item information of items for sale in the category indicated by the category ID and sale item information of items for sale in the descendant categories of the category indicated by the category ID on the basis of the category IDs included in the category information DB 12b and sale item information.

Next, the sale item search unit 144 determines whether or not the search request includes an attribute specification (step S43). When an attribute ID is set in the search request, the search request includes an attribute specification. If the sale item search unit 144 determines that the search request includes an attribute specification (step S43: YES), the sale item search unit 144 proceeds to step S44. On the other hand, if the sale item search unit 144 determines that the search request does not include an attribute specification (step S43: NO), the sale item search unit 144 proceeds to step S45.

In step S44, the sale item search unit 144 searches the found sale item information for sale item information where an attribute value of an attribute item indicated by the attribute ID set in the search request is the same as the attribute value set in the search request. Next, the sale item search unit 144 proceeds to step S47.

In step S45, the sale item search unit 144 determines whether or not the search request includes a keyword. At this time, if the sale item search unit 144 determines that the search request includes a keyword (step S45: YES), the sale item search unit 144 proceeds to step S46. On the other hand, if the sale item search unit 144 determines that the search request includes no keyword (step S45: NO), the sale item search unit 144 proceeds to step S47.

In step S46, the sale item search unit 144 searches the found sale item information for sale item information where the sale item name, the sale item description, or the like includes the keyword set in the search request. Next, the sale item search unit 144 proceeds to step S47.

In step S47, the sale item search unit 144 generates a search result page on the basis of the found sale item information. Then, the sale item search unit 144 transmits the generated search result page to the user terminal 3 that has transmitted the search request. After completing this process, the sale item search unit 144 ends the sale item search process.

In step S48, the sale item search unit 144 determines whether or not the search request includes a brand specification. When a brand name is set in the search request, the search request includes a brand specification. If the sale item search unit 144 determines that the search request includes a brand specification (step S48: YES), the sale item search unit 144 proceeds to step S49. On the other hand, if the sale item search unit 144 determines that the search request does not include brand specification (step S48: NO), the sale item search unit 144 proceeds to step S50.

In step S49, the sale item search unit 144 transmits a brand page corresponding to the brand name set in the search request to the user terminal 3 that has transmitted the search request. After completing this process, the sale item search unit 144 ends the sale item search process.

In step S50, the sale item search unit 144 determines whether or not the search request includes a topic specification. When a topic ID is set in the search request, the search request includes a topic specification. If the sale item search unit 144 determines that the search request includes a topic specification (step S50: YES), the sale item search unit 144 proceeds to step S51. On the other hand, if the sale item search unit 144 determines that the search request does not include topic specification (step S50: NO), the sale item search unit 144 proceeds to step S52.

In step S51, the sale item search unit 144 transmits a topic page corresponding to the topic ID set in the search request to the user terminal 3 that has transmitted the search request. After completing this process, the sale item search unit 144 ends the sale item search process.

In step S52, the sale item search unit 144 searches for sale item information where the sale item name, the sale item description, or the like includes a keyword set in the search request from the sale item information DB 12*d*. Next, the sale item search unit 144 proceeds to step S47.

As described above, according to the present embodiment, when there are two or more keywords that are being inputted by a user, the system control unit 14 identifies a category suitable for the first keyword of the keywords that are being inputted from among a plurality of categories of items for sale, acquires an attribute value suitable for the second keyword different from the first keyword from among attribute values associated with the identified category from the storage unit 12 that stores an attribute name and attribute values of an attribute corresponding to a category in association with each other, and causes the acquired attribute value to be presented as a search condition. Therefore, when a keyword suitable for an attribute value of an item for sale is included in keywords that are being inputted, the attribute value can be presented as a candidate for a search condition.

Further, the system control unit 14 causes a combination of an attribute value and an attribute name associated with the attribute value to be presented as a search condition. Therefore, the user can easily recognize what attribute value of an attribute is a candidate for a search condition.

Further, every time a user inputs a character included in keywords, the system control unit 14 identifies a category suitable for the first keyword of the keywords that are being inputted, acquires an attribute value suitable for the second keyword of the keywords that are being inputted from among attribute values associated with the identified category, and causes the acquired attribute value to be presented. Therefore, an attribute value acquired according to keywords that are being inputted at that time is presented as a search condition. Thus, it is possible to present an attribute value corresponding to an input of a character from a user in real time.

When any one of one or more presented attribute values is selected by a user, the system control unit 14 searches items for sale included in the identified category for items for sale whose attribute value of an attribute indicated by an attribute name associated with the selected attribute value is the same as the selected attribute value. Therefore, the user can easily specify a category and an attribute value as a search condition. Further, it is possible to prevent items for sale other than items for sale having an attribute value desired by the user from being searched for.

2. Second Embodiment

Next, a second embodiment will be described with reference to FIGS. 12A to 12C and 13. In the second embodiment, when the online shopping mall server 1 causes the user terminal 3 to present attribute values as candidates for a search condition, the online shopping mall server 1 determines a priority of presentation of the attribute values on the basis of a relationship between a category suitable for the first keyword, and the second keyword. For example, as shown in FIG. 6B, combinations, each of which includes a category name different from each other, may be displayed in the proposal area 200. In this case, the online shopping mall server 1 performs control so that the priority rank of display of a combination including a category name highly related to the second keyword inputted by a user is high. The priority rank is an example of a priority. Description of the same points as those in the first embodiment will be omitted.

FIG. 12A is a diagram showing an example of content registered in the category information DB 12*b*. In the category information DB 12*b* according to the present embodiment, a category ID, a category name, a related term, a level of the category, a parent category ID, a child category ID list, and one or more pieces of attribute information are registered. The related term is a word related to a category indicated by the category ID. For example, the related term is a word added to an attribute value. As a word added to an attribute value, for example, there is a word that indicates a unit.

FIG. 12B is a diagram showing a registration example of related terms. FIG. 12C is a diagram showing a presentation example of combinations of a category name, an attribute name, and an attribute value. As shown in FIG. 12B, as a related term of "router" of electric drill, for example, "revolutions/minute" is registered. On the other hand, as a related term of "router" of PC/peripheral device, for example, "Mbps" is registered.

In this case, for example, a user inputs "router 500 mbps" in the keyword input field 110. There is a probability that the word "500 mbps" is used for "router" of PC/peripheral device, and a probability that the word "500 mbps" is used for the "router" of electric drill is low. Therefore, the relationship between "500 mbps" and "router" of PC/peripheral device is stronger than the relationship between "500 mbps" and "router" of electric drill is. Therefore, as shown in FIG. 12C, in the proposal area 200, the combination of "router" of PC/peripheral device, "transfer speed", and "500" is displayed at a position higher than that of the combination of "router" of electric drill, "number of revolutions", and "500". In other words, the priority rank of display of the combination of "router" of PC/peripheral device, "transfer speed", and "500" is higher than that of the combination of "router" of electric drill, "number of revolutions", and "500".

On the other hand, if the user inputs "router 500 revolutions" in the keyword input field 110, in the proposal area 200, the combination of "router" of electric drill, "number of revolutions", and "500" is displayed at a position higher than that of the combination of "router" of PC/peripheral device, "transfer speed", and "500".

The parent category of "router" of PC/peripheral device is "PC/peripheral device" and the parent category of "router" of electric drill is "electric drill". An administrator may register "Mbps" as a related term of "PC/peripheral device" instead of registering "Mbps" as a related term of "router" of PC/peripheral device. Further, the administrator may register "number of revolutions" as a related term of "electric drill" instead of registering "number of revolutions" as a related term of "router" of electric drill.

The online shopping mall server 1 may determine whether or not to display combinations instead of determining the priority rank of display of the combinations. Specifically, the online shopping mall server 1 determines that the priority rank of presentation of a combination including a category name related to the second keyword is high and the priority rank of presentation of a combination including a category name not related to the second keyword is low. Then, the online shopping mall server 1 performs control so that only the combination whose priority rank is determined to be high is presented. For example, in the example of FIG. 12B, the user inputs "router 500 mbps" in the keyword input field 110. Then, while the combination of "router" of PC/peripheral device, "transfer speed", and "500" is displayed, the combination of "router" of electric drill, "number of revolutions", and "500" is not displayed.

Figure 13:
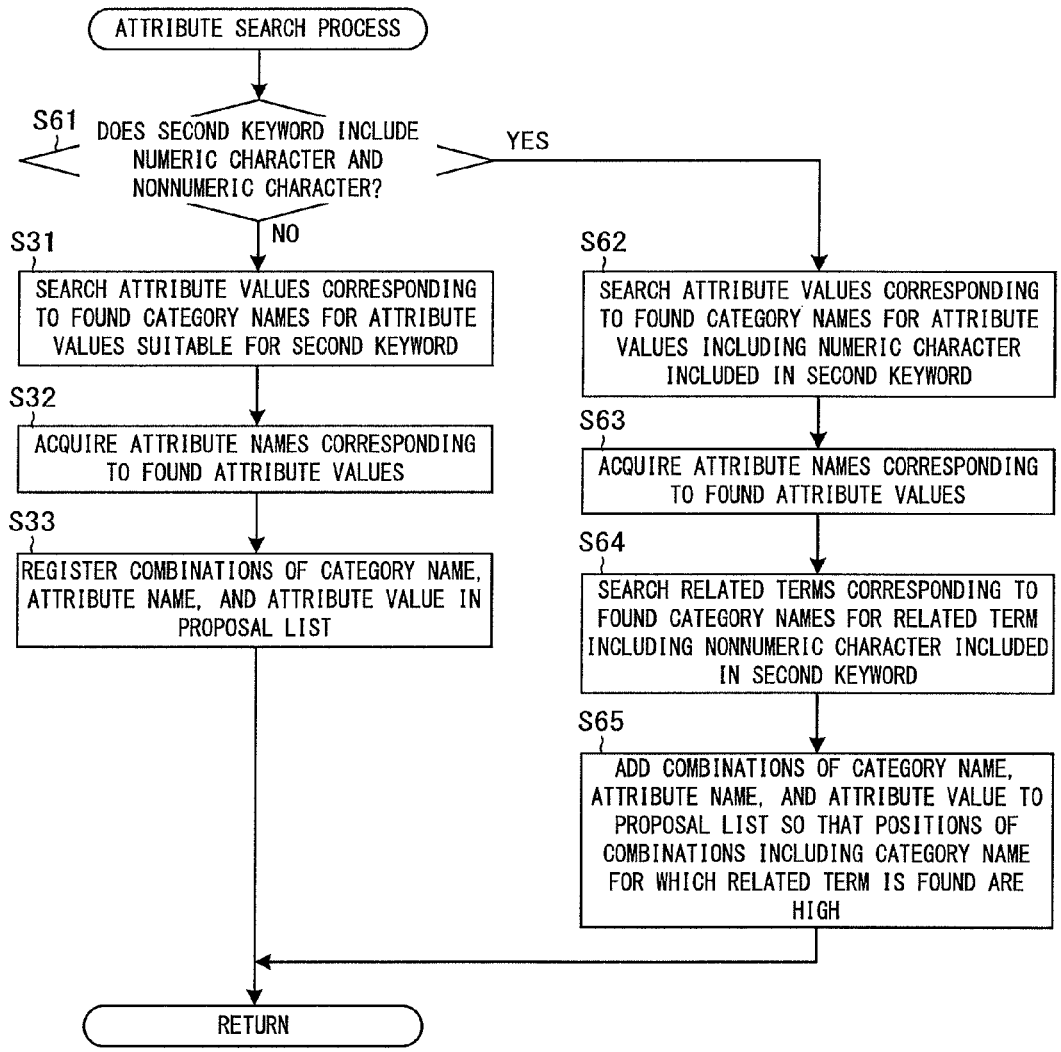
FIG. 13 is a flowchart showing a process example of an attribute search process of the system control unit 14 of the online shopping mall server 1 according to an embodiment.

FIG. 13 is a flowchart showing a process example of the attribute search process of the system control unit 14 of the online shopping mall server 1 according to the present embodiment. In FIG. 13, the same processes as those in FIG. 10B are denoted by the same reference numerals.

As shown in FIG. 13, the search condition candidate providing unit 143 determines whether or not the second keyword inputted by a user includes a numeric character and a character other than a numeric character (step S61). Here, a character other than a numeric character is referred to as a "normumeric character". If the search condition candidate providing unit 143 determines that the second keyword does not include one of a numeric character and a normumeric character (step S61: NO), the attribute value search unit 142 and the search condition candidate providing unit 143 perform steps S31 to S33 and ends the attribute search process. On the other hand, if the search condition candidate providing unit 143 determines that the second keyword includes a numeric character and a normumeric character (step S61: YES), the search condition candidate providing unit 143 proceeds to step S62.

In step S62, the attribute value search unit 142 searches attribute values corresponding to the found category names for attribute values including the numeric character included in the second keyword. Specifically, the attribute value search unit 142 acquires attribute information from category information including a found category name. Next, the attribute value search unit 142 acquires attribute names corresponding to the found attribute values from the attribute information (step S63).

Next, the search condition candidate providing unit 143 searches related terms corresponding to the found category names for a related term including the normumeric character included in the second keyword (step S64). Next, the search condition candidate providing unit 143 registers a combination of a category name corresponding to the attribute value, a category ID corresponding to the category name, the attribute name, an attribute ID corresponding to the attribute name, and the attribute value in the proposal list for each found attribute value. At this time, the search condition candidate providing unit 143 registers the combinations so that the priority rank of display of a combination including a category name for which a related term is found is higher than that of a combination including a category name for which a related term is not found (step S65). The higher the position of a combination in the proposal list, the higher the priority rank of display of the combination. After completing this process, the search condition candidate providing unit 143 ends the attribute search process.

The user terminal 3 that receives the proposal list displays combinations of a category name, an attribute name, and an attribute value in the proposal area 200 according to the order in the proposal list.

As described above, according to the present embodiment, the system control unit 14 determines the priority of presentation of the attribute values on the basis of a relationship between a category suitable for the first keyword and the second keyword. Specifically, the system control unit 14 determines the priority of a combination in which the second keyword includes a word representing a unit used in a category found as a category suitable for the first keyword to be higher than that of a combination in which the second keyword does not includes a word representing a unit used in a found category. Therefore, a user can easily find an attribute value corresponding to a category desired by the user.

3. Third Embodiment

Next, a third embodiment will be described with reference to FIGS. 14A and 14B and 15. In the third embodiment, when the online shopping mall server 1 causes the user terminal 3 to present attribute values as candidates for a search condition, the online shopping mall server 1 determines the priority of presentation of the attribute values on the basis of the number of items for sale having an attribute indicated by a combination of an attribute name and an attribute value. Specifically, the online shopping mall server 1 performs control so that the greater the number of items for sale whose attribute value corresponding to an attribute name included in a combination is an attribute value included in the combination among items for sale included in a category indicated by a category name included in the combination, the higher the priority rank of display of the combination. Description of the same points as those in the first embodiment will be omitted.

Figures 14A, 14B:
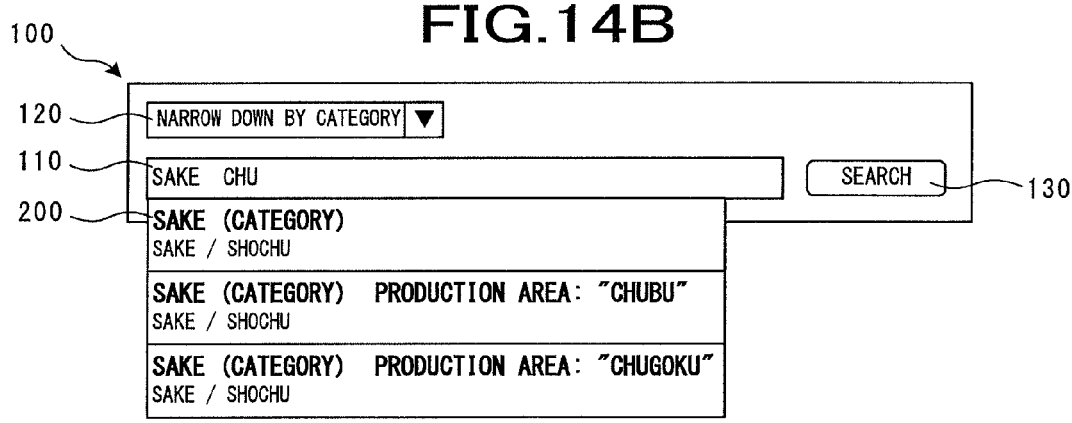
FIG. 14A is a diagram showing an example of the number of items for sale.
FIG. 14B is a diagram showing a presentation example of combinations of a category name, an attribute name, and an attribute value.

FIG. 14A is a diagram showing the number of items for sale. FIG. 14B is a diagram showing a presentation example of combinations of a category name, an attribute name, and an attribute value. For example, as shown in FIG. 14A, there are 100 items for sale which are included in a category of "sake" and whose "production area" is "Chugoku" among items for sale sold in the online shopping mall. Further, there are 200 items for sale which are included in a category of "sake" and whose "production area" is "Chubu". In this case, for example, a user inputs "sake Chu" in the keyword input field 110. Then, as shown in FIG. 14B, in the proposal area 200, the combination of "sake", "production area", and "Chubu" is displayed at a position higher than that of the combination of "sake", "production area", and "Chugoku".

FIGS. 14A and 14B are an example of combinations including the same category name, the same attribute name, and an attribute value different from each other. The above operation is the same as those for combinations including the same category name and an attribute value different from each other and combinations including a category name different from each other.

Figure 15:
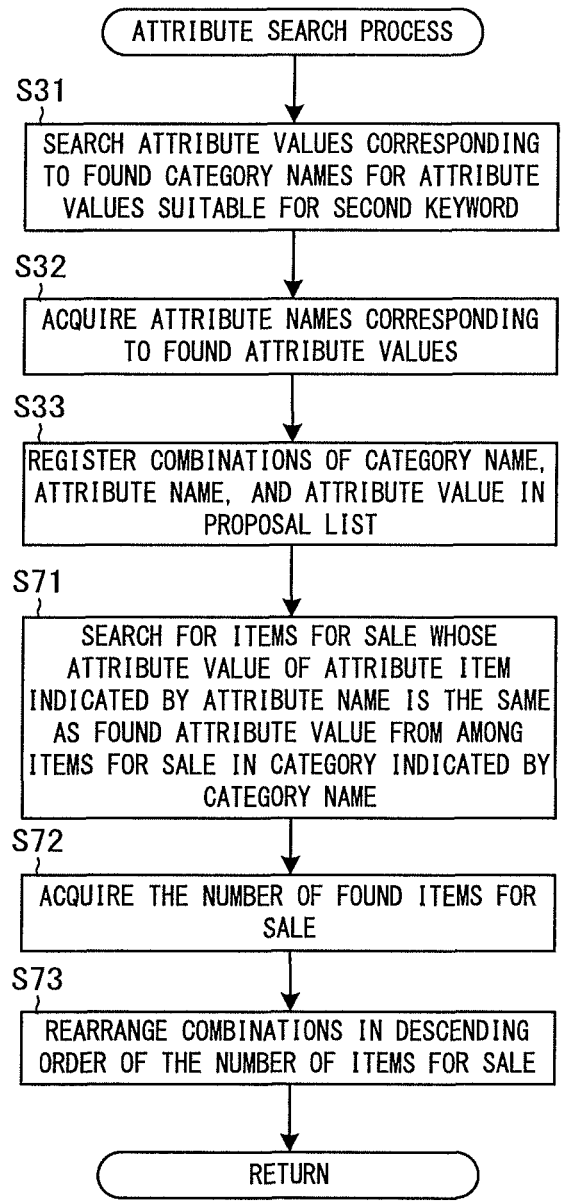
FIG. 15 is a flowchart showing a process example of an attribute search process of the system control unit 14 of the online shopping mall server 1 according to an embodiment.

FIG. 15 is a flowchart showing a process example of the attribute search process of the system control unit 14 of the online shopping mall server 1 according to the present embodiment. In FIG. 15, the same processes as those in FIG. 10B are denoted by the same reference numerals.

As shown in FIG. 15, the attribute value search unit 142 and the search condition candidate providing unit 143 perform steps S31 to S33. Specifically, the sale item search unit 144 searches items for sale included in a category indicated by a category name for items for sale whose attribute value corresponding to an attribute name included in a combination is an attribute value included in the combination for each combination registered in the proposal list (step S71). Specifically, the sale item search unit 144 searches the sale item information DB 12d for sale item information of items for sale included in a category indicated by a category ID included in a combination. Next, the sale item search unit 144 searches the found sale item information for sale item information where an attribute value of an attribute item indicated by an attribute ID included in the combination is the same as an attribute value included in the combination.

Next, the search condition candidate providing unit 143 acquires the number of the found items for sale for each combination (step S72). Specifically, the search condition candidate providing unit 143 counts the number of pieces of the found sale item information. Next, the search condition candidate providing unit 143 rearranges the combinations registered in the proposal list in descending order of the number of the acquired items for sale (step S73). After completing this process, the search condition candidate providing unit 143 ends the attribute search process.

As described above, according to the present embodiment, the system control unit 14 acquires the number of items for sale whose attribute value of an attribute indicated by an attribute name corresponding to an attribute value suitable for the second keyword is that same as an attribute value suitable for the second keyword among items for sale included in a category suitable for the first keyword and determines the priority of presentation of attribute values on the basis of the acquired number. Therefore, a user can easily find an attribute value that is probably desired by the user. The reason of this is that there is a probability that the greater the number of items for sale having an attribute value, the greater the demand for the items for sale having the attribute value.

4. Fourth Embodiment

Next, a fourth embodiment will be described with reference to FIGS. 16A to 16C and 17. In the fourth embodiment, when the online shopping mall server 1 causes the user terminal 3 to present attribute values as a search condition, the online shopping mall server 1 determines the priority of presentation of the attribute values on the basis of a relationship between the second keyword and an attribute item indicated by an attribute name corresponding to an attribute value suitable for the second keyword. Specifically, the online shopping mall server 1 performs control so that the priority rank of display of a combination including an attribute name indicating an attribute item highly related to the second keyword inputted by a user is high. Description of the same points as those in the first embodiment will be omitted.

Figures 16A, 16B, 16C:
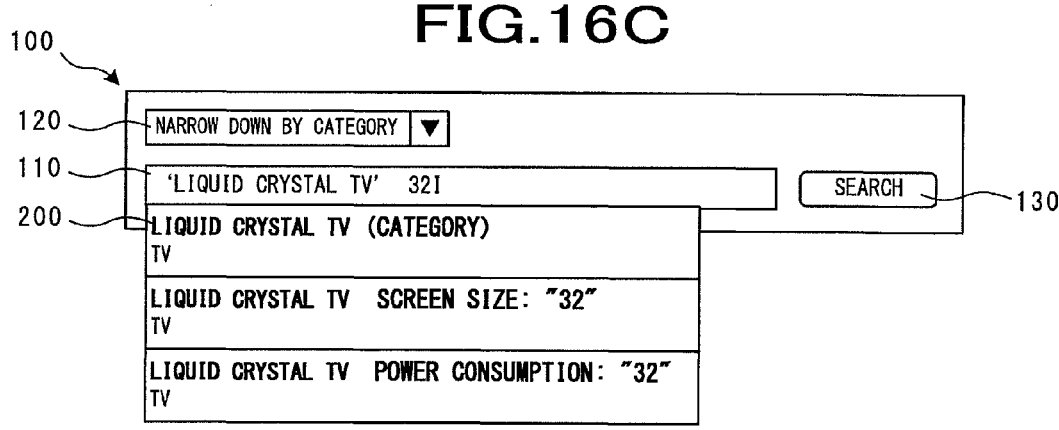
FIG. 16A is a diagram showing an example of content set in attribute information.
FIG. 16B is a diagram showing a registration example of related terms.
FIG. 16C is a diagram showing a presentation example of combinations of a category name, an attribute name, and an attribute value.

FIG. 16A is a diagram showing an example of content set in attribute information. In the attribute information registered in the category information DB 12b according to the present embodiment, an attribute ID, an attribute name, a related term, and one or more attribute values are set. The related term is a word related to an attribute item indicated by the attribute name. For example, the related term is a word added to an attribute value. As a related term added to an attribute value, for example, there is a word that indicates a unit. For example, the related term is a registered for an attribute item whose attribute value is a numerical value.

FIG. 16B is a diagram showing a registration example of related terms. FIG. 16C is a diagram showing a presentation example of combinations of a category name, an attribute name, and an attribute value. As shown in FIG. 16B, as attribute names of a category "liquid crystal TV", for example, there are "power consumption" and "screen size". As a relate word of "power consumption", for example, "W" is registered. As a relate word of "screen size", for example, "inch" is registered.

In this case, for example, a user inputs "'liquid crystal TV' 32i" in the keyword input field 110. "32i" is a part of "32 inch" that indicates a screen size. On the other hand, "32i" is considered not to be a word related to the power consumption. Therefore, as shown in FIG. 16C, in the proposal area 200, the combination of "liquid crystal TV", "screen size", and "32" is displayed at a position higher than that of the combination of "liquid crystal TV", "power consumption", and "32". The online shopping mall server 1 may determine whether or not to display combinations instead of determining the priority rank of display of the combinations.

While FIGS. 16A to 16C are an example of combinations including the same category name, the above operation is the same for combinations including a category name different from each other. For example, in the example of FIGS. 12A to 12C in the second embodiment, it is assumed that "number of revolutions/minute" is registered as a related term of "number of revolutions" of "router" of electric drill and "Mbps" is registered as a related term of "transfer speed" of "router" of PC/peripheral device. In this case, if a user inputs "router 500 mbps" in the keyword input field 110, combinations are displayed in order as shown in FIG. 12C.

FIG. 17 is a flowchart showing a process example of the attribute search process of the system control unit 14 of the online shopping mall server 1 according to the present embodiment. In FIG. 17, the same processes as those in FIG. 13 are denoted by the same reference numerals.

As shown in FIG. 17, the search condition candidate providing unit 143 determines whether or not the second keyword inputted by a user includes a numeric character and a normumeric character (step S61). At this time, if the search condition candidate providing unit 143 determines that the second keyword does not include one of a numeric character and a normumeric character (step S61: NO), the attribute value search unit 142 and the search condition candidate providing unit 143 perform steps S31 to S33 and ends the attribute search process. On the other hand, if the search condition candidate providing unit 143 determines that the second keyword includes a numeric character and a normumeric character (step S61: YES), the search condition candidate providing unit 143 performs step S62.

When the attribute value search unit 142 completes the process of step S62, the search condition candidate providing unit 143 acquires attribute names and related terms corresponding to the found attribute values from attribute information (step S81). Next, the search condition candidate providing unit 143 searches the acquired related terms for related terms including the normumeric character included in the second keyword (step S82). Next, the search condition candidate providing unit 143 registers a combination of a category name corresponding to the attribute value, a category ID corresponding to the category name, the attribute name, an attribute ID corresponding to the attribute name, and the attribute value in the proposal list for each found attribute value. At this time, the search condition candidate providing unit 143 registers the combinations so that the priority rank of display of a combination including an attribute name for which a related term is found is higher than that of a combination including an attribute name for which a related term is not found (step S83). After completing this process, the search condition candidate providing unit 143 ends the attribute search process.

As described above, according to the present embodiment, the system control unit 14 determines the priority of presentation of the attribute values on the basis of a relationship between an attribute indicated by an attribute name associated with an attribute value suitable for the first keyword and the second keyword. Specifically, the system control unit 14 determines the priority of an attribute value where the second keyword includes a word indicating a unit of an attribute item indicated by an attribute name associated with an attribute value suitable for the second keyword to be higher than that of an attribute value where the second keyword does not include a word indicating a unit of an attribute item indicated by an attribute name associated with an attribute value suitable for the second keyword. Therefore, a user can easily find an attribute value desired by the user.

The online shopping mall server 1 may determine the priority of presentation of combinations of a category name, an attribute name, and an attribute value by combining two or more embodiments from among the second to the fourth embodiments.

5. Fifth Embodiment

Next, a fifth embodiment will be described with reference to FIGS. 18 to 20. In the fifth embodiment, while a user is inputting the first keyword, that is, one keyword, as a search condition, the online shopping mall server 1 causes the user terminal 3 to present the user with combinations of an attribute name and an attribute value suitable for the first keyword that is being inputted. Specifically, the online shopping mall server 1 searches attribute values corresponding to attribute names of all categories for attribute values suitable for the first keyword. Then, the online shopping mall server 1 causes the user terminal 3 to present the user with combinations of an attribute name corresponding to a found attribute value and the found attribute value as candidates for a search condition.

Figure 18:
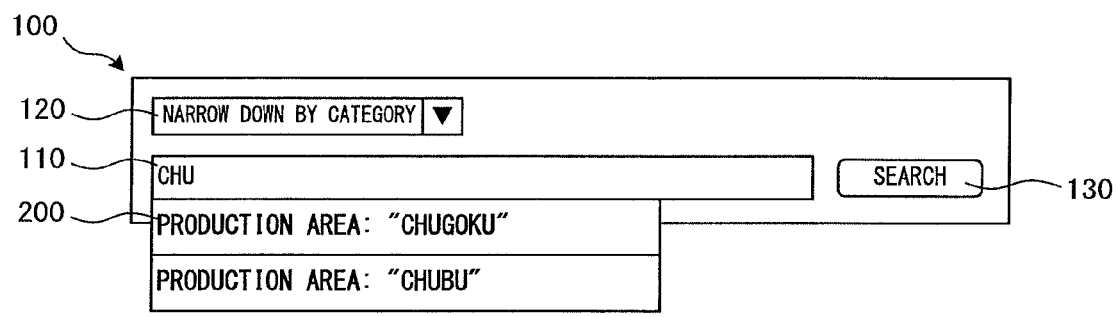
FIG. 18 is a diagram showing a presentation example of combinations of an attribute name and an attribute value.

FIG. 18 is a diagram showing a presentation example of combinations of an attribute name and an attribute value. As shown in FIG. 18, "Chu" is inputted in the keyword input field 110. Then, in the proposal area 200, a combination of "production area" and "Chugoku" and a combination of "production area" and "Chubu" are displayed. Any of the combinations is a combination corresponding to "sake" and "mineral water". The online shopping mall server 1 may perform control so that only the attribute values are displayed in the proposal area 200 and the attribute names are not displayed.

When a user selects any combination from one or more presented combinations, the online shopping mall server 1 searches items for sale in a category having an attribute indicated by an attribute name included in the selected combination for items for sale whose an attribute value of an attribute indicated by an attribute name of the item for sale is the same as the attribute value included in the selected combination. For example, in FIG. 18, the user selects the combination of "production area" and "Chubu" from the proposal area 200. Then, the online shopping mall server 1 searches items for sale in each of categories "sake" and "mineral water", which have an attribute of "production area", for items for sale whose "production area" is "Chubu".

Figure 19:
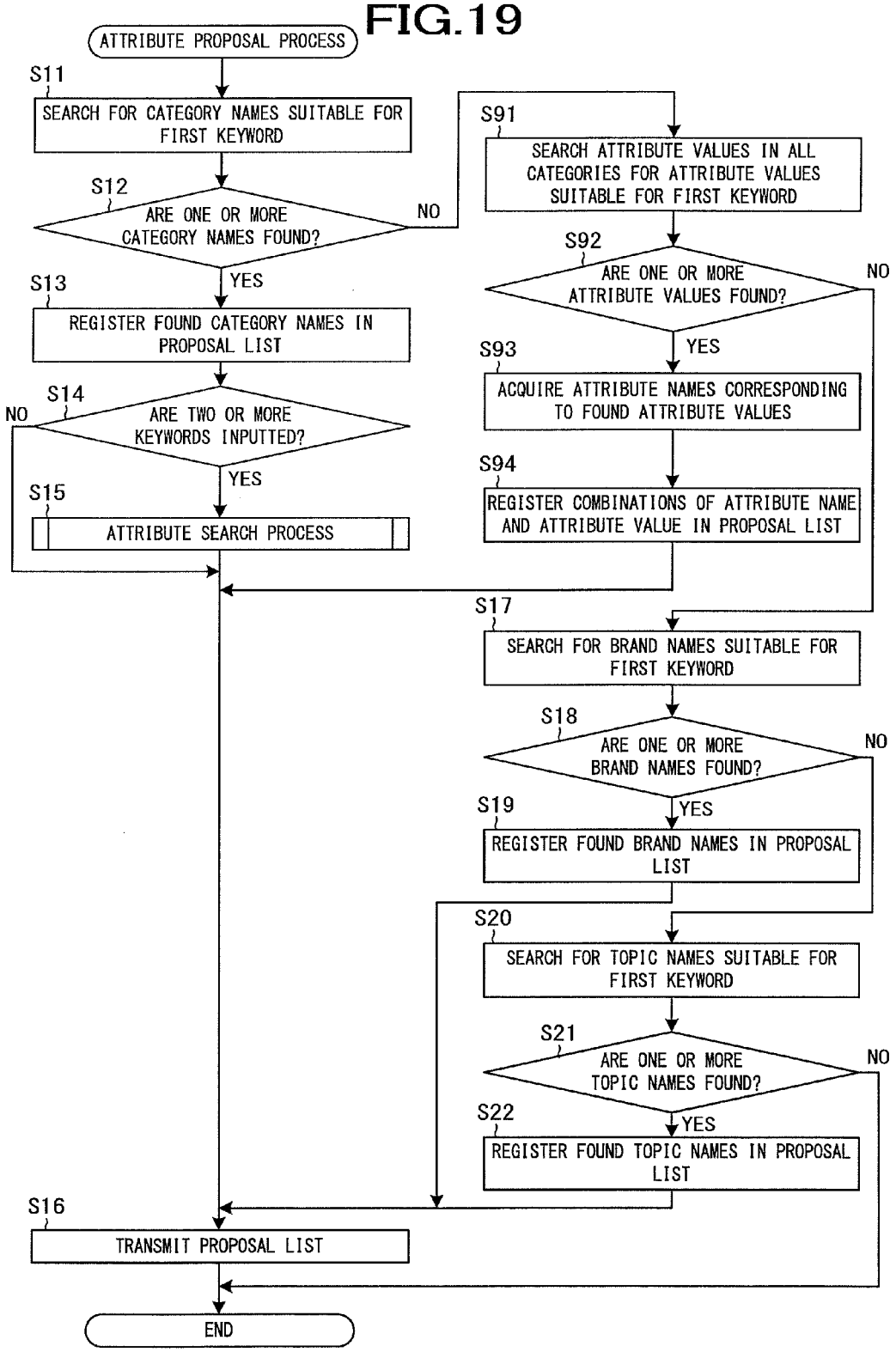
FIG. 19 is a flowchart showing a process example of an attribute proposal process of the system control unit 14 of the online shopping mall server 1 according to an embodiment.

FIG. 19 is a flowchart showing a process example of the attribute proposal process of the system control unit 14 of the online shopping mall server 1 according to the present embodiment. In FIG. 19, the same processes as those in FIG. 10A are denoted by the same reference numerals. As shown in FIG. 19, in step S12, if the category search unit 141 determines that no category name is found (step S12: NO), the category search unit 141 proceeds to step S91. In step S91, the attribute value search unit 142 searches attribute values in all categories for attribute values suitable for the first keyword. Specifically, the attribute value search unit 142 searches all attribute information registered in the category information DB 12b for attribute values that include the first keyword. At this time, the attribute value search unit 142 may search for attribute values whose meaning is the same as that of the first keyword and whose notation is different from that of the first keyword.

Next, the attribute value search unit 142 determines whether or not one or more attribute values are found (step S92). At this time, if the attribute value search unit 142 determines that one or more attribute values are found (step S92: YES), the attribute value search unit 142 proceeds to step S93. On the other hand, if the attribute value search unit 142 determines that no attribute value is found (step S92: NO), the attribute value search unit 142 proceeds to step S17.

In step S93, the attribute value search unit 142 acquires attribute names corresponding to the found attribute values from the attribute information. Next, the search condition candidate providing unit 143 registers a combination of the attribute name corresponding to the attribute value, an attribute ID corresponding to the attribute name, and the attribute value in the proposal list for each found attribute value (step S94). At this time, the search condition candidate providing unit 143 registers the combinations so that a combination of the same attribute name and the same attribute value is not registered twice. In the present embodiment, when there are the same attribution names between different categories, an attribute IDs corresponding to the attribute names are the same between the categories. After completing the process of step S94, the search condition candidate providing unit 143 transmits the proposal list to the user terminal 3 (step S16). For example, as shown in FIG. 18, the user terminal 3, which receives the proposal list, displays the proposal area 200 and further displays combinations in the proposal area 200.

Figure 20:
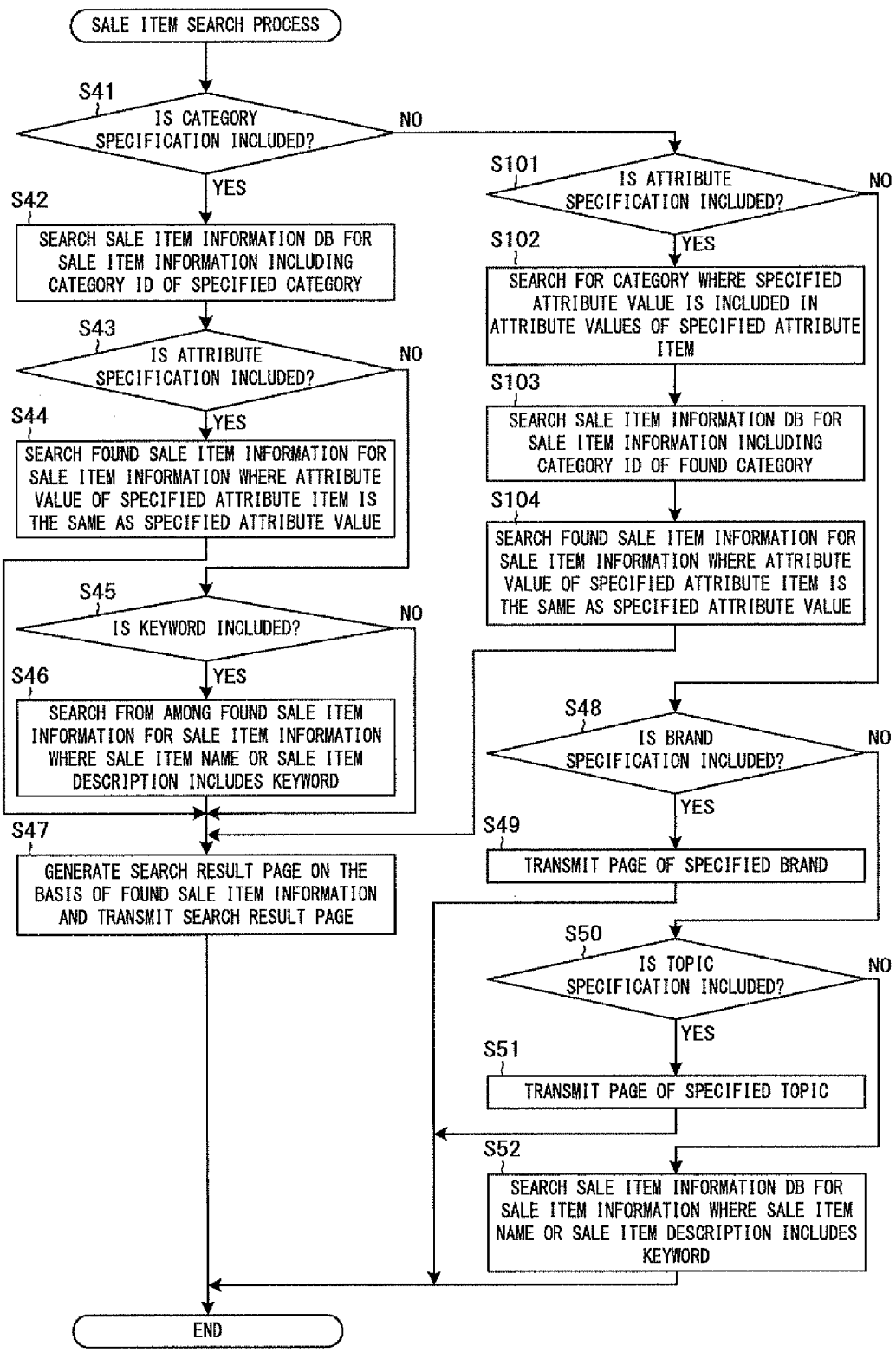
FIG. 20 is a flowchart showing a process example of a sale item search process of the system control unit 14 of the online shopping mall server 1 according the embodiment.

FIG. 20 is a flowchart showing a process example of the sale item search process of the system control unit 14 of the online shopping mall server 1 according to the present embodiment. In FIG. 20, the same processes as those in FIG. 11 are denoted by the same reference numerals. When a user selects a combination of an attribute name and an attribute value from the proposal area 200 in the top page, the user terminal 3 transmits a search request. In this case, the search request includes an attribute ID corresponding to the selected attribute name and the selected attribute value.

As shown in FIG. 20, in step S41, if the sale item search unit 144 determines that the search request does not include a category specification (step S41: NO), the sale item search unit 144 proceeds to step S101. In step S101, the sale item search unit 144 determines whether or not the search request includes an attribute specification. At this time, if the sale item search unit 144 determines that the search request includes an attribute specification (step S101: YES), the sale item search unit 144 proceeds to step S102. On the other hand, if the sale item search unit 144 determines that the search request does not include an attribute specification (step S101: NO), the sale item search unit 144 proceeds to step S48.

In step S102, the sale item search unit 144 searches for a category of items for sale having a specified attribute. Specifically, the sale item search unit 144 searches for attribute information that includes the attribute ID set in the search request and the attribute value set in the search request from the category information DB 12b. Then, the sale item search unit 144 acquires a category ID from category information including the found attribute information. Next, the sale item search unit 144 searches for sale item information of items for sale included in a category indicated by the acquired category ID from the sale item information DB 12d (step S103). The determination method at this time is the same as that in step S42. Next, the sale item search unit 144 searches the found sale item information for sale item information where an attribute value of an attribute item indicated by the attribute ID set in the search request is the same as the attribute value set in the search request (step S104). Next, the sale item search unit 144 generates and transmits a search result page on the basis of the found sale item information (step S47).

As described above, according to the present embodiment, the system control unit 14 acquires an attribute value suitable for a keyword that is being inputted from the storage unit 12 that stores an attribute name and attribute values of an attribute corresponding to a category in association with each other and causes the acquired attribute value to be presented as a search condition. Therefore, when a keyword that is being inputted is a keyword suitable for an attribute value of an item for sale, the attribute value can be presented as a candidate for a search condition.

6. Sixth Embodiment

Next, a sixth embodiment will be described with reference to FIGS. 21 and 22. In the sixth embodiment, while a user is inputting a first keyword in a state in which the user has already selected a category, the online shopping mall server 1 causes the user terminal 3 to present keywords suitable for the keyword that is being inputted from among keywords related to the selected category to the user. Further, the online shopping mall server 1 causes the user terminal 3 to present the user with combinations of an attribute name and an attribute value suitable for the first keyword. In this case, the attribute value is selected from among attribute values associated with the selected category.

Figure 21:
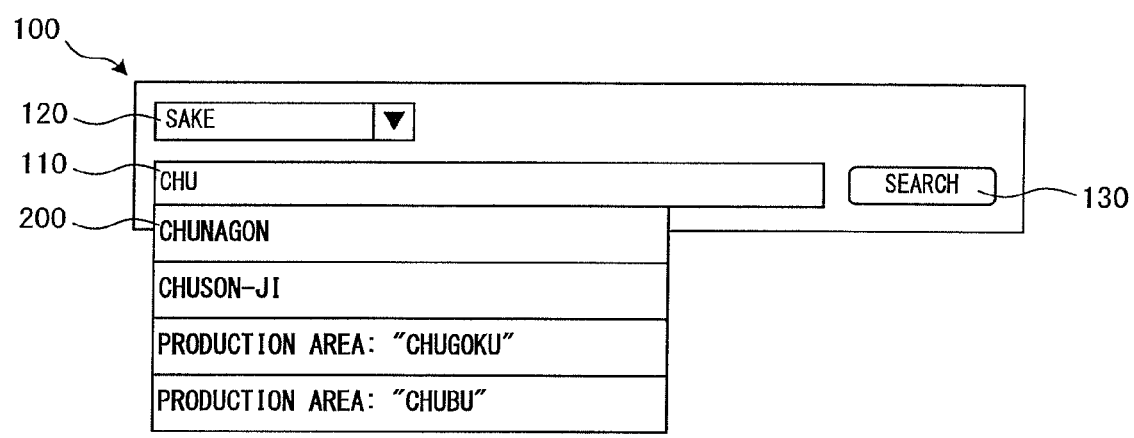
FIG. 21 is a diagram showing a presentation example of keywords and combinations of an attribute name and an attribute value.

FIG. 21 is a diagram showing a presentation example of keywords and combinations of an attribute name and an attribute value. As shown in FIG. 21, a user selects "sake" by operating the category selection menu 120. Alternatively, for example, the user may specify a category of "sake" as a search condition and the online shopping mall server 1 may search for items for sale belonging to the category of "sake". In this case, a search result page including the search condition setting area 100 is displayed on the screen of the user terminal 3. The category selection menu 120 at this time is in a state in which "sake" is selected. In the state in which the category of "sake" is selected, "Chu" is inputted in the keyword input field 110. Then, in the proposal area 200, keywords "Chunagon" and "Chuson-ji" are displayed and further a combination of "production area" and "Chugoku" and a combination of "production area" and "Chubu" are displayed. "Chunagon" and "Chuson-ji" are, for example, names of a brand of sake. The combination of "production area" and "Chugoku" and the combination of "production area" and "Chubu" are combinations corresponding to a category of "sake". For example, when handbag is selected as a category, these combinations are not displayed.

If the user selects any one of the one or more presented keywords, the online shopping mall server 1 performs keyword search f items for sale belonging to the selected category for items for sale by using the selected keyword. If the user selects any one of the one or more presented combinations, the online shopping mall server 1 searches items for sale belonging to the selected category for items for sale whose attribute value of an attribute indicated by an attribute name included in the selected combination is the same as the attribute value included in the selected combination.

For example, a query log DB and a keyword DB are constructed in the storage unit 12 in order to present keywords related to a category. In the query log DB, query logs are registered. The online shopping mall server 1 registers a query log every time receiving a search request. The query log includes, for example, a reception date and time of the search request and information of a search condition included in the search request. The information of a search condition includes a keyword, a category ID, an attribute value, and/or the like. In the keyword DB, keywords related to a category are registered. Specifically, in the keyword DB, a plurality of combinations of a category ID and a keyword are registered. For example, the online shopping mall server 1 registers combinations that are often specified as a search condition by a user from among combinations of a category ID and a keyword. By referring to the query log DB, the online shopping mall server 1 can extract a combination that is often specified. For example, the online shopping mall server 1 may register combinations that have been specified a predetermined number of times or more.

In the present embodiment, the system control unit 14 further functions as a keyword search unit. The keyword search unit searches keywords related to the selected category for keywords suitable for a keyword that is being inputted. FIG. 22 is a flowchart showing a process example of the attribute proposal process of the system control unit 14 of the online shopping mall server 1 according to the present embodiment. In FIG. 22, the same processes as those in FIG. 10A are denoted by the same reference numerals. For example, every time a user inputs a character in the keyword input field 110 in the top page, the user terminal 3 transmits a character string inputted in the keyword input field 110 at that time to the online shopping mall server 1. At this time, if a category is selected, the user terminal 3 transmits a category ID of the selected category and the inputted character string.

As shown in FIG. 22, in step S12, if the category search unit 141 determines that no category name is found (step S12: NO), the category search unit 141 proceeds to step S111. In step S111, the keyword search unit determines whether or not a category ID is received from the user terminal 3. At this time, if the keyword search unit determines that no category ID is received (step S111: NO), the keyword search unit proceeds to step S91. On the other hand, if the keyword search unit determines that a category ID is received (step S111: YES), the keyword search unit proceeds to step S112.

In step S112, the keyword search unit searches keywords related to the received category ID for keywords suitable for the first keyword. Specifically, the keyword search unit acquires category IDs of descendant categories of the category indicated by the received category ID from the category information DB 12b. Then, the keyword search unit searches for keywords corresponding to the received category ID and keywords corresponding to the category IDs of the descendant categories from the keyword DB. Next, the keyword search unit searches the found keywords for keywords suitable for the first keyword. The keyword category name suitable for the first keyword may be, for example, at least one of a keyword identical to the first keyword and a keyword partially identical to the first keyword. Further, the keyword category name suitable for the first keyword may be, for example, a keyword whose front part identical to the first keyword and/or a keyword whose back part identical to the first keyword. Next, the keyword search unit registers the found keywords in the proposal list (step S113).

Next, the attribute value search unit 142 searches attribute values in the category indicated by the received category ID for attribute values suitable for the first keyword. Specifically, the attribute value search unit 142 searches for attribute information including the received category ID and attribute information including a category ID of the descendant categories from the category information DB 12b. Next, the attribute value search unit 142 searches for attribute values including the first keyword from the found attribute information. Next, the attribute value search unit 142 proceeds to step S92.

The sale item search process is the same as that in FIG. 20. When the user selects a keyword from the proposal area 200, the user terminal 3 transmits a search request. In this case, the search request includes the category ID of the selected category and the selected keyword. In this case, in step S46, the sale item search unit 144 searches sale item information belonging to the category indicated by the category ID set in the search request for sale item information where the sale item name, the sale item description, or the like includes the keyword set in the search request. When the user selects a combination of an attribute name and an attribute value from the proposal area 200, the user terminal 3 transmits a search request. In this case, the search request includes a category ID of the selected category, an attribute ID corresponding to the selected attribute name, and the selected attribute value. In this case, in step S44, the sale item search unit 144 searches sale item information belonging to the category indicated by the category ID set in the search request for sale item information where an attribute value of an attribute item indicated by the attribute ID set in the search request is the same as the attribute value set in the search request.

As described above, according to the present embodiment, the system control unit 14 acquires keyword suitable for a keyword that is being inputted among keywords related to a category specified by the user from the storage unit 12 that stores a category and a keyword in association with each other and causes the acquired keywords to be presented as a search condition. Therefore, it is possible to reduce the time and effort to input a keyword.

In the embodiments described above, the present invention is applied to the online shopping mall in which items for sale are sold from a plurality of shops. However, the present invention may be applied to a web site of electronic commerce in which items for sale are sold from a single distributor.

In the embodiments described above, the search object of the present invention is applied to an item for sale. However, the search object of the present invention may be applied to, for example, a service, a web page, an image, a moving image, a sound, a map, news, an article of a blog, or the like.

REFERENCE SIGNS LIST

1 Online shopping mall server
2 Shop terminal
3 User terminal
11 Communication unit
12 Storage unit
12a Member information DB
12b Category information DB
12c Topic information DB
12d Sale item information DB
13 Input/output interface
14 System control unit
14a CPU
14b ROM
14c RAM
15 System bus
141 Category search unit
142 Attribute value search unit
143 Search condition candidate providing unit
144 Sale item search unit
145 Brand name/topic name search unit
NW Network
S Information processing system

The invention claimed is:

1. An information processing apparatus comprising:
at least one memory operable to store program code;
at least one processor operable to read the program code and operate as instructed by the program code, the program code including:
object search code that causes the at least one processor to receive a search word through a search condition setting area in a web page from a user and search based on the received search word;
category identification code that causes the at least one processor to, when a first search word has been completed and entered by the user and a second search word has not been completed and is being currently inputted by the user, identify, from a plurality of search categories, a child search category based on the first search word and at least two different parent search categories to which the child search category belongs;
attribute value acquisition code that causes the at least one processor to, in response to the second search word being currently input by the user, in a state in which the child search category and the at least two different parent search categories have been identified, acquire, from a storage that stores at least one attribute name, indicating a name of an attribute of an item corresponding to each of the plurality of search categories, and stores attribute values, indicating values of the attribute of the item corresponding to each of the plurality of search categories and associated with each of the at least one attribute name, a plurality of attribute values, each corresponding to the child search category that belongs to each of the at least two different parent search categories, based on the second search word that is being currently inputted; and presentation control code that causes the at least one processor to present, at the search condition setting area in the web page, for each of the plurality of attribute values acquired by the attribute value acquisition code, a combination of the child search category, a corresponding parent search category, an acquired attribute value and an attribute name associated with the acquired attribute value, as a candidate for a search condition such that the child search category, the corresponding parent search category, the attribute value, and the attribute name of the combination are concurrently selected upon selection of the combination by the user, wherein a plurality of combinations are respectively presented for the at least two different parent search categories, and attribute values, acquired based on the second search word that is being currently inputted, are associated with different attribute names in the combinations corresponding to different parent search categories, wherein the object search code causes the at least one processor to, when any combination of the combinations presented by the presentation control code is selected by the user, search for at least one search object that is included in the child search category having been identified and the corresponding parent search category and has an attribute indicated by the selected combination.

2. The information processing apparatus according to claim 1, wherein every time a character included in the second search word is inputted by the user, the presentation control code causes the at least one processor to present, for each of the plurality of attribute values acquired by the attribute value acquisition code according to the second search word that is being currently inputted, the combination of the child search category, the corresponding parent search category, the acquired attribute value and the attribute name associated with the acquired attribute value.

3. The information processing apparatus according to claim 1, wherein the presentation control code causes the at least one processor to determine a priority of presentation of the combinations on the basis of a relationship between the selected child search category and the second search word.

4. The information processing apparatus according to claim 1, further comprising:

number acquisition code that causes the at least one processor to acquire, for each of the combinations, a number of search objects, among search objects included in the selected child search category and the corresponding parent search category, which have an attribute indicated by the corresponding combination, wherein the presentation control code causes the at least one processor to determine a priority of presentation of each of the combinations on the basis of the number acquired by the number acquisition code.

5. The information processing apparatus according to claim 1, wherein the presentation control code causes the at least one processor to determine a priority of presentation of each of the combinations on the basis of a relationship between an attribute indicated by the corresponding combination and the second search word that is being currently inputted.

6. An information processing method performed by a computer, the method comprising:

receiving a search word through a search condition setting area in a web page from a user and search based on the received search word;

when a first search word has been completed and entered by the user and a second search word has not been completed and is being currently inputted by the user, identifying, from a plurality of search categories, a child search category based on the first search word and at least two different parent search categories of items to which an item corresponding to the child search category belongs;

in response to the second search word being currently input by a user in a state in which a child search category and the at least two different parent search categories have been identified, acquiring, from a storage that stores at least one attribute name, indicating a name of an attribute of an item corresponding to each of the plurality of search categories, and stores attribute values, indicating values of the attribute of the item corresponding to each of the plurality of search categories and associated with each of the at least one attribute name, a plurality of attribute values, each corresponding to the child search category that belongs to each of the at least two different parent search categories, based on the second search word that is being currently inputted; and presenting, at the search condition setting area in the web page, for each of the acquired plurality of attribute values, a combination of the child search category, a corresponding parent search category, an acquired attribute value and an attribute name associated with the acquired attribute value to be presented as a candidate for a search condition such that the child search category, the corresponding parent search category, the attribute value, and the attribute name of the combination are concurrently selected upon selection of the combination by the user, wherein a plurality of combinations are respectively presented for the at least two different parent search categories, and attribute values, acquired based on the second search word that is being currently inputted, are associated with different attribute names in the combinations corresponding to different parent search categories, when any combination of the presented combinations is selected by the user, searches for at least one search object that is included in the child search category having been identified and the corresponding parent search category and has an attribute indicated by the selected combination.

7. A non-transitory computer-readable recording medium storing an information processing program to be executed by a computer, the information processing program including:

object search code that causes the computer to receive a search word through a search condition setting area in a web page from a user and search based on the received search word;

category identification code that causes the computer to, when a first search word has been completed and entered by a user and a second search word has not been completed and is being currently inputted by the user, identify, from a plurality of child search categories, a child search category based on the first search word and at least two different parent search categories of items to which an item corresponding to the child search category belongs;

attribute value acquisition code that causes the computer to, in response to the second search word being currently input by the user in a state in which the child search category and the at least two different parent search categories have been identified, acquire, from a storage that stores at least one attribute name, indicating a name of an attribute of an item corresponding to each of the plurality of search categories, and stores attribute values, indicating values of the attribute of the item corresponding to each of the plurality of search categories and associated with each of the at least one attribute name, a plurality of attribute values, each corresponding to the child search category that belongs to each of the at least two different parent search categories, based on the second search word that is being currently inputted; and presentation control code that causes the computer to present, at the search condition setting area in the web page, for each of the plurality of attribute values acquired by the attribute value acquisition code, a combination of the child search category, a corresponding parent search category, an acquired attribute value and an attribute name associated with the acquired attribute value, as a candidate for a search condition such that the child search category, the corresponding parent search category, the attribute value, and the attribute name of the combination are concurrently selected upon selection of the combination by the user, wherein a plurality of combinations are respectively presented for the at least two different parent search categories, and attribute values, acquired based on the second search word that is being currently inputted, are associated with different attribute names in the combinations corresponding to different parent search categories, wherein the object search code causes the computer to, when any combination of the combinations presented by the presentation control code is selected by the user, search for at least one search object that is included in the child search category having been identified and the corresponding parent search category and has an attribute indicated by the selected combination.

* * * * *